United States Patent
Abrahami et al.

(10) Patent No.: US 11,670,016 B2
(45) Date of Patent: Jun. 6, 2023

(54) SYSTEM FOR SUPPORTING FLEXIBLE COLOR ASSIGNMENT IN COMPLEX DOCUMENTS

(71) Applicant: Wix.com Ltd., Tel Aviv (IL)

(72) Inventors: Avishai Abrahami, Tel Aviv (IL); Giora Kaplan, Tel Aviv (IL); Nadav Abrahami, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 71 days.

(21) Appl. No.: 17/319,143

(22) Filed: May 13, 2021

(65) Prior Publication Data

US 2021/0279915 A1    Sep. 9, 2021

Related U.S. Application Data

(63) Continuation of application No. 16/686,255, filed on Nov. 18, 2019, now Pat. No. 11,010,936, which is a continuation of application No. 15/339,984, filed on Nov. 1, 2016, now Pat. No. 10,482,630, which is a continuation of application No. 13/959,759, filed on Aug. 6, 2013, now Pat. No. 9,513,771.

(60) Provisional application No. 61/679,814, filed on Aug. 6, 2012.

(51) Int. Cl.
*G06F 3/04842* (2022.01)
*G06T 11/00* (2006.01)
*G06F 3/0482* (2013.01)

(52) U.S. Cl.
CPC .......... *G06T 11/001* (2013.01); *G06F 3/0482* (2013.01); *G06F 3/04842* (2013.01); *G06T 2200/24* (2013.01)

(58) Field of Classification Search
CPC .......................... G06T 11/001; G06F 17/30905
USPC .................. 715/723, 825; 345/590; 348/734; 358/448
See application file for complete search history.

(56) References Cited

U.S. PATENT DOCUMENTS

| 6,039,434 | A | 3/2000 | Moroney |
| 6,246,803 | B1 | 6/2001 | Gauch |
| 7,502,033 | B1 | 3/2009 | Axelrod |

(Continued)

FOREIGN PATENT DOCUMENTS

CA    2687473 A1 * 11/2008    ....... G06F 17/30905

*Primary Examiner* — Ruay Ho
(74) *Attorney, Agent, or Firm* — Heidi Brun Associates Ltd.

(57) ABSTRACT

A system for handling color assignment within a complex document includes a user interface to facilitate user modification of at least one first color to at least one second color within a previously chosen color scheme for a component of the document, the color scheme having a principal colors and a of associated subordinate colors per principal color displayed as a matrix, a color handler to update the previously chosen color scheme color scheme to produce an updated color scheme matching a perceived brightness of the at least one second color, the color handler including a unifier to calculate an average perceived brightness for all cells in a row within the matrix and to change the lightness value for each cell while keeping the same hue and saturation to ensure that all cells within the row have the same perceived brightness, and a color processor to apply the updated color scheme.

14 Claims, 20 Drawing Sheets
(9 of 20 Drawing Sheet(s) Filed in Color)

(56) References Cited

U.S. PATENT DOCUMENTS

| | | | |
|---|---|---|---|
| 8,593,478 B2* | 11/2013 | O'Brien-Strain | ............................ H04N 1/40062 358/448 |
| 2005/0122543 A1 | 6/2005 | Walker | |
| 2005/0240881 A1 | 10/2005 | Rush et al. | |
| 2009/0262130 A1 | 10/2009 | Ramirez | |
| 2011/0164188 A1* | 7/2011 | Karaoguz | .......... H04N 21/4122 348/734 |
| 2012/0002219 A1 | 1/2012 | Komine | |
| 2012/0210229 A1* | 8/2012 | Bryant | .................. G06T 11/001 715/723 |
| 2013/0176326 A1* | 7/2013 | Safaee-Rad | .............. G09G 5/02 345/590 |
| 2014/0062297 A1 | 3/2014 | Bora | |
| 2016/0045827 A1 | 2/2016 | Moya | |

\* cited by examiner

SYSTEM FOR SUPPORTING FLEXIBLE COLOR ASSIGNMENT IN COMPLEX DOCUMENTS

CROSS-REFERENCE TO RELATED APPLICATIONS

This application is a Continuation Application of U.S. patent application Ser. No. 16/686,255 filed 18 Nov. 2019, which is a Continuation Application of U.S. patent application Ser. No. 15/339,984 filed Nov. 1, 2016 and issued as U.S. Pat. No. 10,482,630, which is a Continuation Application of U.S. patent application Ser. No. 13/959,759 filed Aug. 6, 2013, and issued as U.S. Pat. No. 9,513,771, which claims priority from U.S. Provisional Patent Application: 61/679,814, filed Aug. 6, 2012, all of which are incorporated in their entirety by reference.

FIELD OF THE INVENTION

The present invention relates to document editing systems generally and to color assignment in particular.

BACKGROUND OF THE INVENTION

Document editing systems come in all shapes and sizes and handle complex documents containing different elements. These documents may include traditional word processing documents or spreadsheets, as well as considerably more complex document types such as web sites, e-shops, charts, multi-media presentations to name a few. Such documents often combine regular visual elements (e.g. text and pictures) with procedural and/or action elements (such as navigation buttons) which allow a user to move from one document page to another.

Such systems typically employ a number of mechanisms to allow the creation and maintenance of complex documents, often including thousands of elements of all types. One such mechanism is hierarchical document organization where documents are defined in terms of a hierarchy of their elements. Leaf and non-leaf nodes of the hierarchy may be maintained separately. Another such mechanism is the use of an inheritance relationship between document elements. A document element may be defined based on another document element (to which modifications are applied) and so on.

Complex documents often include multiple pages which share common layouts, colors and elements. This feature has many names in different systems such as template, master pages or master slides. To implement this capability, systems known in the art may allow a designer to define an inheritance relationship between elements in the document. With this relationship, document elements of all levels may serve as template elements to other elements. The pertinent system may also implement multi-level inheritance (e.g. A inherits from B which inherits from C) as well as multiple inheritance (e.g. A inherits from both B and C). The inheritance relationships between document elements are not required to follow the hierarchical document structure. For example, multi picture components contained within multiple containers may all inherit certain properties (such as the way the picture frame is designed) from a common template picture element defined in a separate place within the hierarchy. However, the inheritance relationships do have to form a directed acyclic graph so that no circular inheritance paths exist. Elements which inherit properties from other elements may modify and/or override some properties. For example, a regular page A may inherit a set of components from a master page B and add additional components or change some display properties specified by master page B. Inheritance may be dynamic or inherit-by-copy. If A inherits from B through dynamic inheritance and B is modified, the modifications made to B are automatically reflected in A. In the inherit-by copy case, the changes made to B are not reflected in A which inherited from B only by copying it.

Complex document editing systems typically allow its users to assign colors to various parts and sub-parts of the document. The colors help to make the documents more visually appealing and help to differentiate between different features of a document. For example, text appears distinctly from its background, pop-up warnings can appear in a color distinct from the regular page etc.

A designer may assign specific colors to various elements in a document and colors may be assigned according to a particular role. For example, the designer may assign the color red to the role of a fill color of a rectangular shaped element and the color blue to the role of frame color of the same rectangle component. The pertinent editing system may support assigning colors to color roles at the element definition level, e.g. use the color red as the fill color for all rectangles created from now on, or for all rectangles in the document in general (including existing rectangles). The system may also support assigning colors to color roles at the specific element creation level, e.g. use the blue color for the rectangle being created right now.

Some color assignments may be non-atomic by nature e.g. a text paragraph can have a different color (and background color) for each letter of the text. Container elements may also have colors assigned to them. For example a container component may have the color blue assigned as the background color for the container's content and brown for the container's frame. For document editing systems that implement inheritance support, colors are inheritable properties and can be modified in any inherited element.

For most document editing systems, colors are typically selected using a color picker user interface. In general color pickers can be classified into two types, unstructured color pickers and structured color pickers. Unstructured color pickers typically allow colors to be selected from the entire color gamut available in one or more color spaces such as that provided in Microsoft's Office which is shown in regular mode (FIG. 1), customized RGB mode (FIG. 2) and customized HSL (hue, saturation, lightness) mode (FIG. 3). Another example is the color picker provided by IDM Computer Solution's UltraEdit product (FIG. 4).

Structured color pickers provide for the selection of colors from a set of variations of a basic color scheme. These variations are typically lighter or darker variations of the basic colors of the color schemes and can also be tints and shades of the colors. The pertinent document editing system typically provides a set of predefined color schemes for use in all documents, with some systems providing the ability to expand the set or edit the color schemes. The colors specified in the color scheme may be known as the principal colors and the tints and shades may be known as the subordinate colors. The system typically generates these variations by creating for each principal color, a set of subordinate colors having the same basic hue but different lightness or luminance value as defined in the standard HSL (hue, saturation, lightness) or HSV (hue, saturation, value) color models.

A color picker typically includes two user interface elements, one to select which color scheme to be used (sometimes known as the scheme picker) and one to allow the selection of an actual color such as is illustrated in FIGS. 5 and 6 to which reference is now made. FIG. 5 shows Microsoft PowerPoint 2007's color scheme picker and FIG. 6 shows Microsoft PowerPoint 2007's theme color picker.

The principal colors and subordinate colors are typically organized (and displayed) in a type of matrix format with the principal colors forming the top row and the subordinate colors for each principal color stemming from them as a column as is illustrated in FIG. 7 to which reference is now made. FIG. 7 illustrates a basic color scheme matrix with five principal colors, each of them having five subordinate colors.

An important feature of systems which include a structured color picker is the ability to replace some or all of the colors in the color scheme—both the principal colors and the subordinate colors—and thereby affect the color assignment. This may be implemented in various ways. The first is by replacing the current color scheme by selecting a new color scheme using the scheme picker. This replaces all the principal colors and the subordinate colors associated with them. The second method is by replacing a specific principal color by selecting a new color for the given principal color position. The associated subordinate colors are also replaced by the relevant color variations of the new principal color. The third method is replacing a specific subordinate color. This would make the replaced subordinate color to be "out of line" with the rest of the subordinate colors located in the same column within the matrix. Therefore, when assigning a color from a color scheme matrix to a document element, what is really assigned is the color scheme matrix cell index. For example, if the color from cell [3,4] is in use ($3^{rd}$ column, $4^{th}$ row of the color scheme) as the fill color for a given rectangle, e.g. light red, and the value of cell [3,4] is changed to dark blue, the fill color for the given rectangle would change to dark blue. This change would happen regardless of the way in which cell [3,4] is modified.

SUMMARY OF THE PRESENT INVENTION

There is provided, in accordance with a preferred embodiment of the present invention, a system implementable on a computing device for handling color assignment within a complex document, the system includes a user interface to facilitate user modification of at least one first color to at least one second color within a previously chosen color scheme for a component of the document, the previously chosen color scheme having a predetermined number X of principal colors and a predetermined number Y of associated subordinate colors per principal color and where the principal colors and the associated subordinate colors are displayed as a matrix with the principal colors forming the top row and the associated subordinate colors stemming from them as a column. It also includes a color handler to modify the previously chosen color scheme to produce an updated color scheme to match a perceived brightness of the at least one second color throughout at least a portion of the updated color scheme, the color handler further includes a unifier to calculate an average perceived brightness for all cells in a row within the matrix and to change the lightness value for each cell while keeping the same hue and saturation to ensure that all cells within the row have the same perceived brightness, and a color processor to process and apply the updated color scheme at least to the component.

2 Moreover, in accordance with a preferred embodiment of the present invention, the color handler includes a brightness handler to determine at least one of the HSV (hue, saturation, lightness) color parameters needed to generate the perceived brightness for the at least one second color.

Further, in accordance with a preferred embodiment of the present invention, the color handler includes a color overrider to modify one of: saturation, lightness, and perceived brightness while keeping constant the hue of the at least one second color constant to generate at least one second color value for at least one color cell of the matrix for a particular portion of the document.

Still further, in accordance with a preferred embodiment of the present invention, the color overrider includes a color blender to modify the one of: saturation, lightness, and perceived brightness using linear range mapping.

Additionally, in accordance with a preferred embodiment of the present invention, the color blender includes a bucket handler to divide an available perceived brightness range into buckets to create target perceived brightness values for the color blender and where sizes of the buckets are not uniform.

Moreover, in accordance with a preferred embodiment of the present invention, the color handler includes a column adapter handler to adapt a target column of the matrix to a base column to create uniformity between the associated subordinate colors positioned in the same row but in different columns.

Further, in accordance with a preferred embodiment of the present invention, the color handler includes an inverter to reverse the previously chosen color scheme while retaining the association of components of the document to specific positions in the updated color scheme.

Still further, in accordance with a preferred embodiment of the present invention, the system includes an inheritance processor to implement the user modification according to at least one pre-defined inheritance relationship between the component and at least one other component in the document.

There is provided, in accordance with a preferred embodiment of the present invention, a method for handling color assignment within a complex document, the method implemented on a processor and includes on the processor, facilitating user modification of at least one first color to at least one second color within a previously chosen color scheme for a component of the document, the previously chosen color scheme having a predetermined number X of principal colors and a predetermined number Y of associated subordinate colors per principal color and where the principal colors and the associated subordinate colors are displayed as a matrix with the principal colors forming the top row and the associated subordinate colors stemming from them as a column. The method also includes on the processor, modifying the previously chosen color scheme to produce an updated color scheme to match a perceived brightness of the at least one second color throughout at least a portion of the updated color scheme, the modifying the previously chosen color scheme further comprising calculating an average perceived brightness for all cells in a row within the matrix and changing the lightness value for each cell while keeping the same hue and saturation to ensure that all cells within the row have the same perceived brightness; and processing and applying the updated color scheme at least to the component.

Moreover, in accordance with a preferred embodiment of the present invention, the modifying the previously chosen color scheme includes determining at least one of the HSV (hue, saturation, lightness) color parameters needed to generate the perceived brightness for the at least one second color.

Further, in accordance with a preferred embodiment of the present invention, the modifying the previously chosen color scheme includes modifying one of: saturation, lightness, and perceived brightness while keeping constant the hue of the at least one second color to generate at least one second color value for at least one color cell of the matrix for a particular portion of the document.

Still further, in accordance with a preferred embodiment of the present invention, the modifying the previously chosen color scheme includes modifying one of: saturation, lightness, and perceived brightness using linear range mapping.

Additionally, in accordance with a preferred embodiment of the present invention, the modifying one of: saturation, lightness, and perceived brightness includes dividing an available perceived brightness range into buckets and creating target perceived brightness values for the modifying the previously chosen color scheme, where the modifying one of: saturation, lightness, and perceived brightness and where sizes of the buckets are not uniform.

Moreover, in accordance with a preferred embodiment of the present invention, the modifying the previously chosen color scheme includes adapting a target column of the matrix to a base column to create uniformity between the associated subordinate colors positioned in the same row but in different columns.

Further, in accordance with a preferred embodiment of the present invention, the modifying the previously chosen color scheme includes reversing the color scheme while retaining the association of components of the document to specific positions in the color scheme.

Still further, in accordance with a preferred embodiment of the present invention, the method also includes implementing the user modification according to at least one pre-defined inheritance relationship between the component and at least one other component in the document.

BRIEF DESCRIPTION OF THE DRAWINGS

The patent or application file contains at least one drawing executed in color. Copies of this patent or patent application publication with color drawings will be provided by the Office upon request and payment of the necessary fee.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
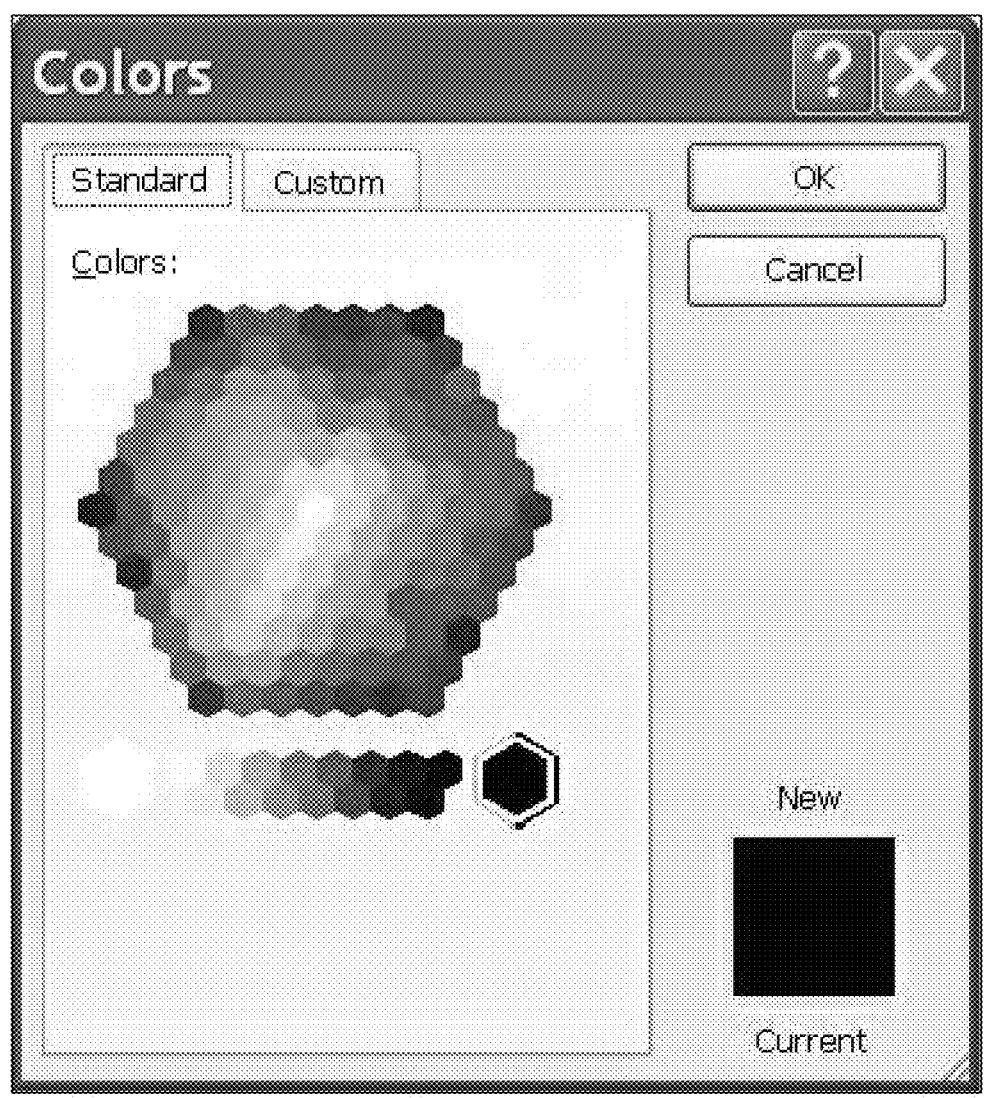
FIG. 1 is an exemplary screenshot of Microsoft Office's regular mode color picker.
Figure 2:
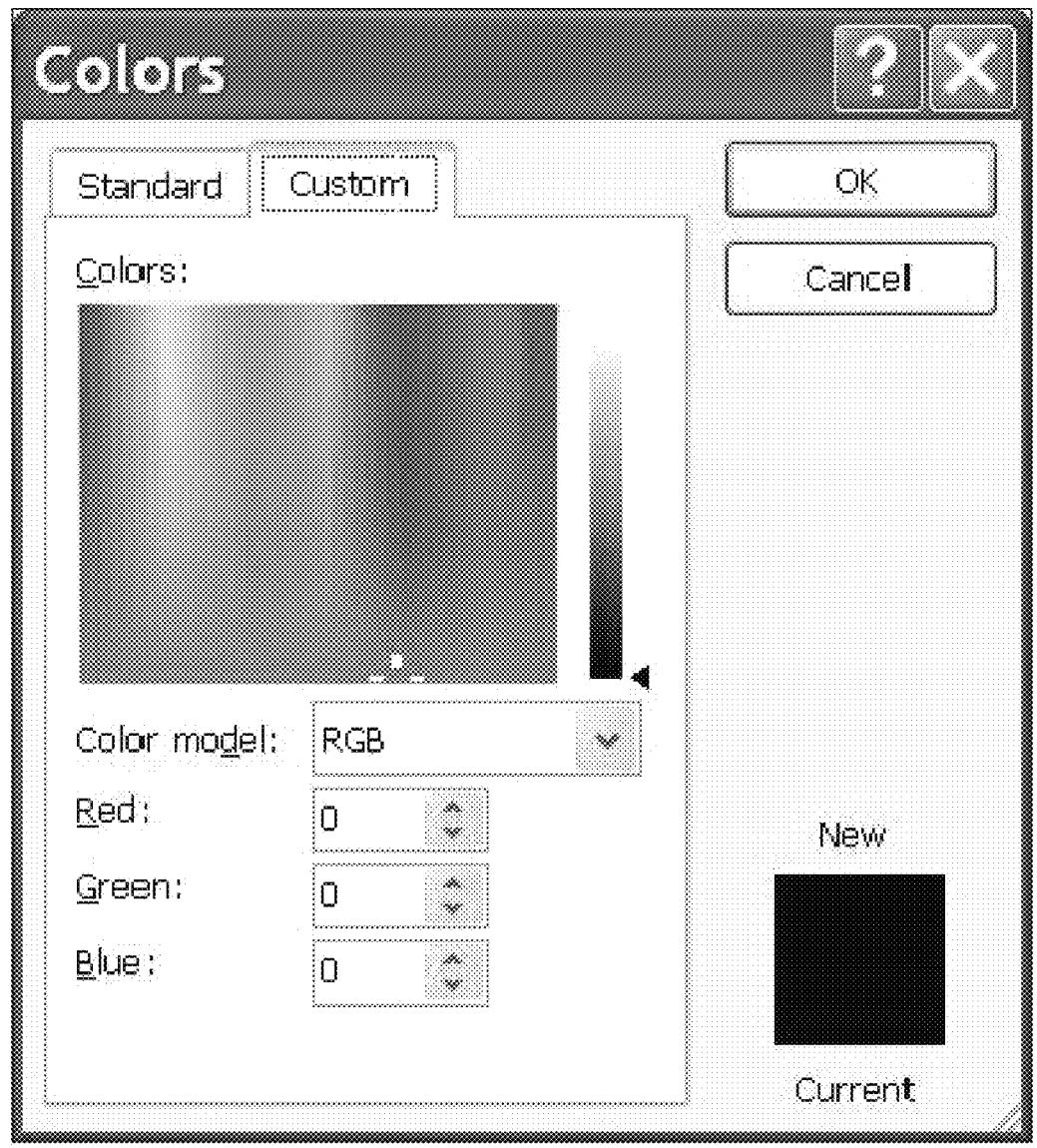
FIG. 2 is an exemplary screenshot of Microsoft Office customized RGB mode color picker.
Figure 3:
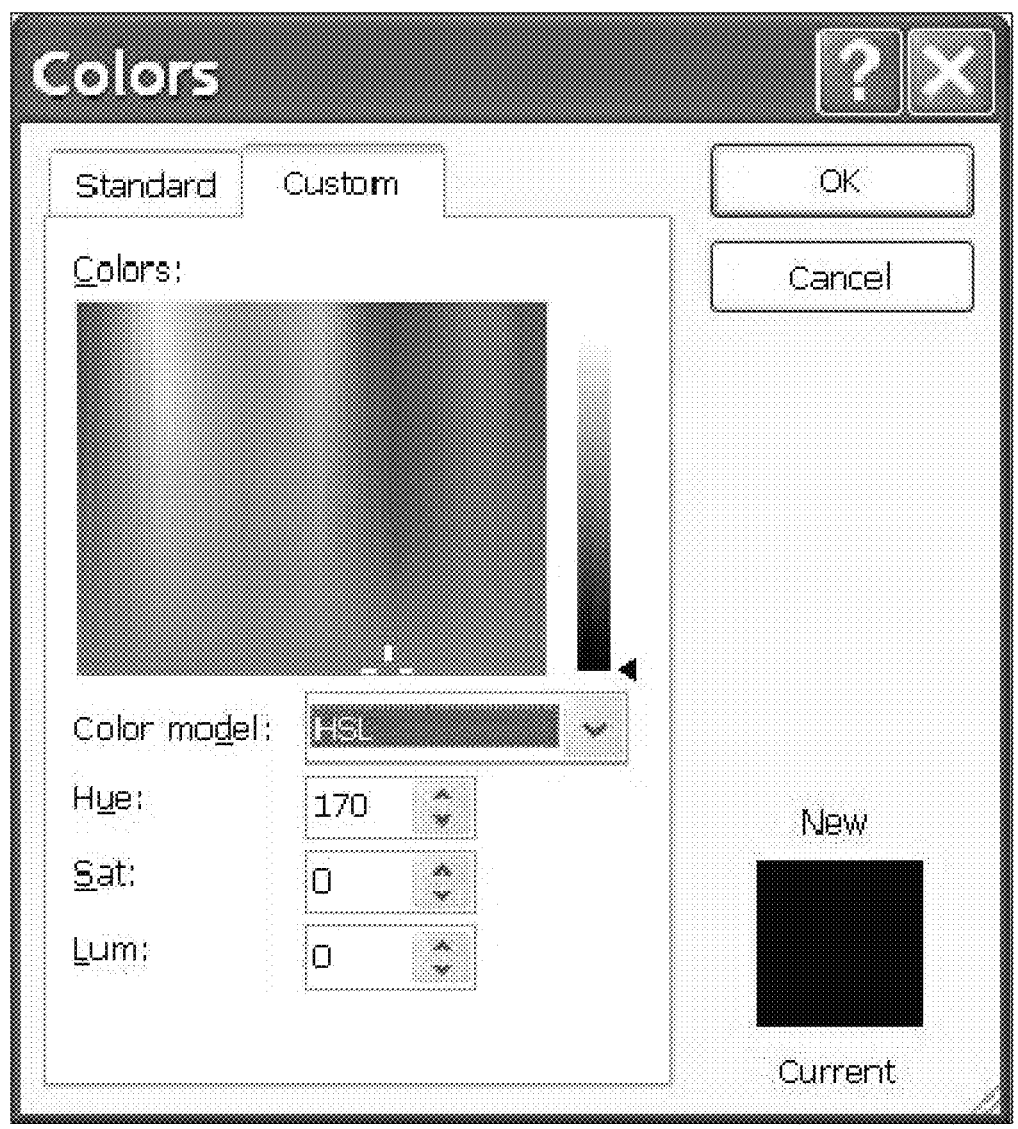
FIG. 3 is an exemplary screenshot of Microsoft Office's customized HSL mode color picker.
Figure 4:
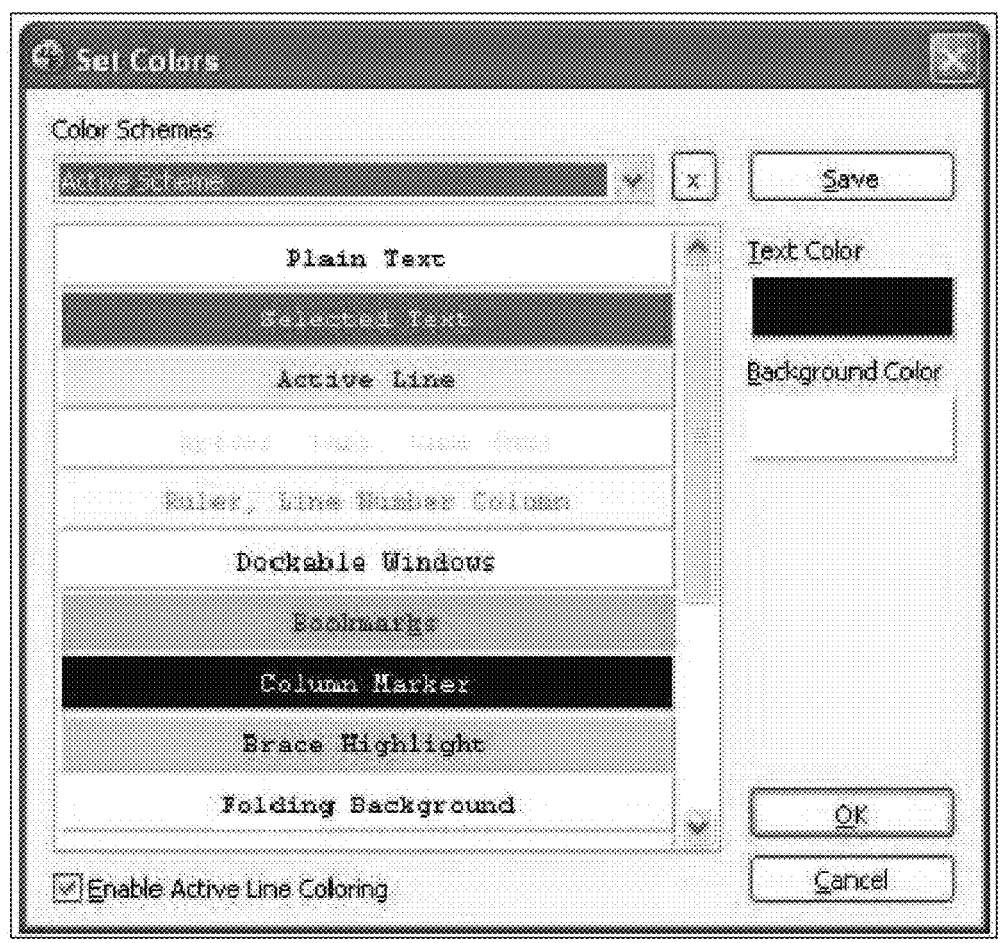
FIG. 4 is an exemplary screenshot of IDM Computer Solutions' UltraEdit color picker.
Figure 5:
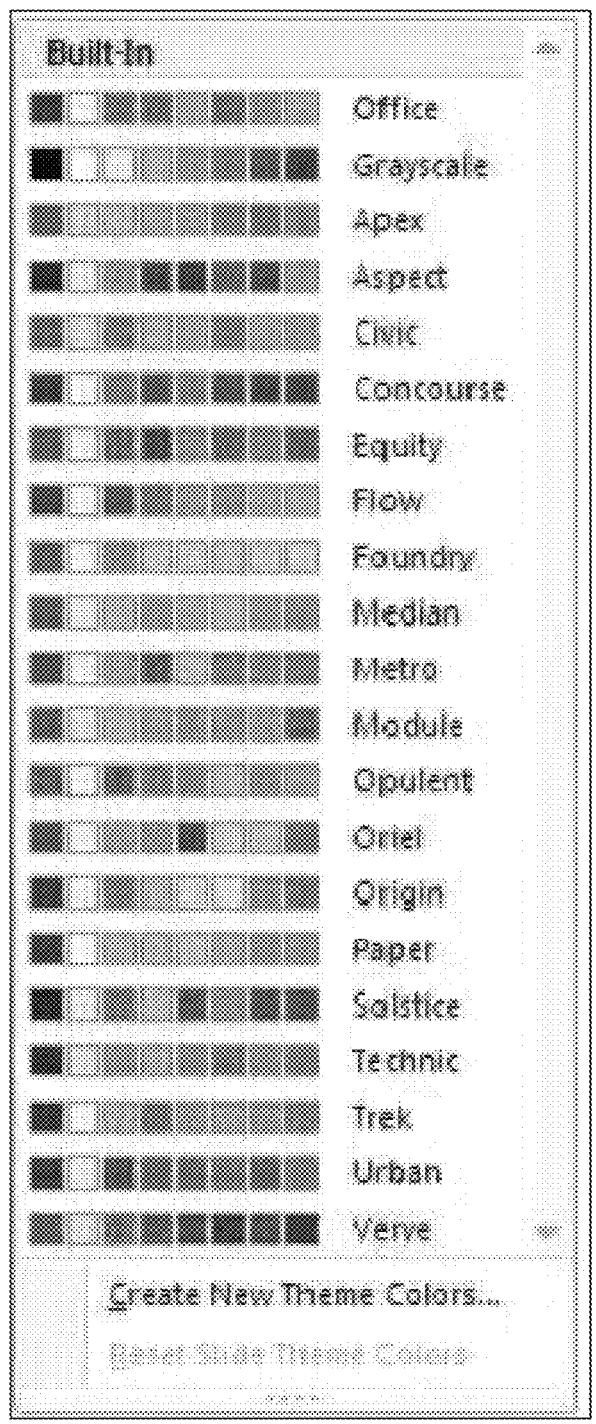
FIG. 5 is an exemplary screenshot of Microsoft PowerPoint 2007's scheme picker.
Figure 6:
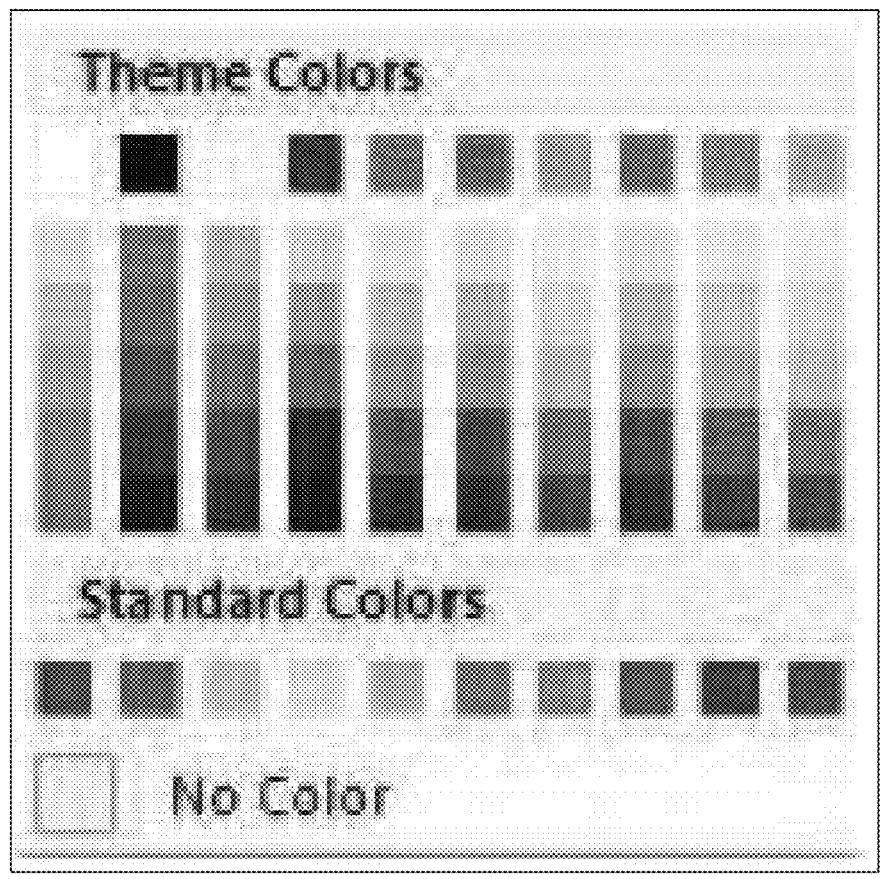
FIG. 6 is an exemplary screenshot of Microsoft PowerPoint 2007's theme color picker.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the color picker system as discussed in the background is not integrated with the entire document architecture and in particular within systems that have hierarchical design and inheritance capabilities. For example, a designer designing an e-shop web application may wish to create different areas of the site for different departments. There may be a department devoted to marine water sports, colored in shades of blue, green and yellow. There may also be a toy department colored in primary colors—red, blue and yellow. Current document editing systems known in the art, do not provide a way of adding standard items (elements) to the store in each of the two areas and at the same time maintain the different color schemes for each department.

Existing systems also do not provide sufficiently rich mechanisms to handle the requirement to highlight specific elements. For example, in the department store e-shop described herein above, the designer may wish to use the color dark gray from color scheme matrix cell [2,4] for all product titles and text, but to use a particular shade of blue from a different color scheme for the product of the day. Existing systems do not provide a way to define a particular color, preserve its definition when the associated principal color changes, define it relative to the base principal color of the subordinate color column in which it resides (color-wise or lightness wise) and re-use this highlighting color for multiple elements (e.g. multiple products of the day).

Applicants have also realized that present systems typically create the subordinate color column variations based on the lightness or value properties of the HSL/HSV color spaces. However the perceived brightness of the different colors is vastly different. For example, assuming an equal saturation of 90% and a lightness of 50%, a typical yellow color (HSL 0.16/0.90/0.50, RGB F2E90D) has a brightness of 84% whereas a typical blur color (HSL 0.66/0.90/0.50, RGB OD16F2) has a brightness of 34% only. This may cause a perceived brightness difference between the color specified for a given text paragraph and the color specified for its background to be too small after a principle color change, making the text unreadable.

Due to the use of lightness variations to create subordinate color column variations for each principal color as discussed herein above, the rows in a color scheme matrix do not typically have a uniform perceived brightness. Thus, when selecting the colors for text from different cells in the same row (supposedly representing a similar lightness), the designer of a system often has to change the color selected for the background of the pertinent text element in order to preserve the required contrast. It will be appreciated that this is important when some of the subordinate colors have been changed from their original color scheme value.

Applicants have realized that the above limitations may be overcome by integrating color scheme handling into the document hierarchy and element inheritance employed by such complex document editing systems as described in the background.

Figure 8:
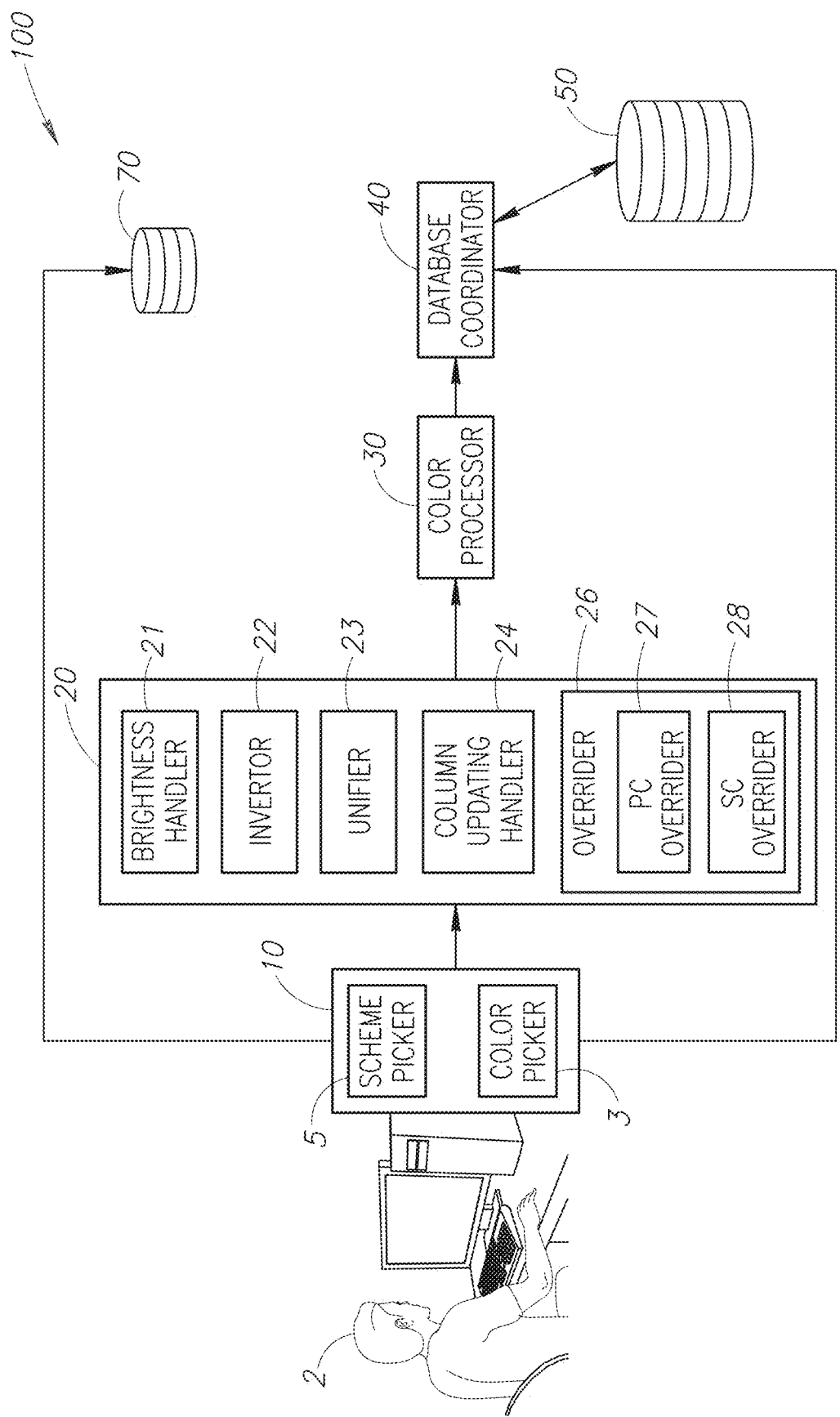
FIG. 8 is a schematic illustration of system for handling color assignment within a complex document, designed an operative in accordance with a preferred embodiment of the present invention.

Reference is now made to FIG. 8 which illustrates a system 100 for handling color assignment within a complex document, in accordance with an embodiment of the present invention. System 100 comprises a user interface 10, a color handler 20, a color scheme processor 30, a database coordinator 40 and a database 50. User interface 10 comprises a color picker 3 and a scheme picker 5. Color handler 20 comprises a brightness adjuster 21, an invertor 22, a unifier 23, a column updating handler 24 and an overrider 26. Overrider 26 may further comprise a principal color overrider 27 and a subordinate color overrider 28. System 100 may also comprise a mini database 70 which sit locally may hold session specific information as described in more detail herein below.

It will be appreciated that the purpose of system 100 is to enable designer 2 to define a basic set of root color scheme definitions (which are not copied or inherited from another source) and to allow designer 2 to make modifications to the color schemes so as to create a set of color schemes specific to a particular document component which may differ from that defined by the pertinent document editing system in use. It will be further appreciated that at any point in time, when working within the context of a given document element (container or atomic), a current color scheme may be defined which is the default color scheme from the current colors which are selected.

It will also be appreciated that system 100 may allow designer 2 to create a new color scheme from available ones and to also change the current color scheme while maintaining the harmony between the colors by preserving as much as possible, specific color choices made by designer 2 which override the current color scheme. System 100 may also allow designer 2 to maintain the perceived brightness difference between elements in the document as described in more detail herein below.

System 100 may be embedded within an interactive design system that is used by designers to create complex web sites and applications. It may also be embedded inside systems ranging from traditional word processing and spreadsheet editing systems to complex presentation creation systems and database systems as well as interactive development environments. It will be further appreciated that system 100 may be installed locally on a computing device or mobile computing device. In an alternative embodiment, system 100 may be installed on a server based system embedded within a larger host system through an API connection, a web services connection or any other type of interface.

Designer 2 may pick a scheme and/or a color to be used via user interface 10 together with scheme picker 5 and color picker 3. Database 50 may store system given color schemes as well as customized color schemes together with component information pertinent to the design system in use and style information.

It will be appreciated that designer 2 may access scheme picker 5 during the component editing stage and may pick a current color scheme from the available color schemes presented by scheme picker 5. Scheme picker 5 may typically display additional meta-data information for each color scheme currently available in addition to the colors themselves. Scheme picker 5 may either present to designer 2 color schemes from the displayed application i.e. may access the general system display, color schemes held in database 50 or may present previously defined color schemes which may be local and/or session specific and may be held locally on mini database 70.

Color picker 3 may allow designer 2 to pick colors for a given role for a given display element (such as the fill color for a specific rectangle component) or for any display element (for example the default frame color for all circle elements) from the chosen current scheme. Color picker 3 may be further used to pick a color for use when changing the colors in the current color scheme or any other color scheme.

Color picker 3 may also allow the selection of a color from a set of global colors. These may be additional colors which are not part of the principal/subordinate set and may be global to the entire system in use, to a given color scheme or be global at another level of the system (i.e. belong to a given container). Color picker 3 may also allow the selection of an arbitrary new color from the entire available color space. Such an element typically includes the ability to type in directly a color definition (e.g., using the RGB, HSL or HSV values) or by sampling a color from given point or area in the displayed application screen.

It will be appreciated that designer 2 may make his selection using a mouse, touch screen or any other suitable input device provided by the platform in use.

As discussed herein above, designer 2 may typically work with the current color scheme assigned to a pertinent component. It will be appreciated that the current color scheme may be replaced with a different color scheme which in turn may become the current color scheme. This may be done by selecting a different color scheme offered by scheme picker 5. Another method of changing the color scheme for the pertinent component may be switching the style associated with a given element. Other methods of changing the current color scheme such as inversion are described in more detail herein below.

Once designer 2 has chosen a current color scheme and/or color for the component in question, color handler 20 may be used to modify it. For example, color handler 20 may be used by designer 2 to modify the chosen color scheme to produce an updated color scheme to match a perceived brightness of a modified color within the pertinent color scheme. Color handler 20 may also be used to re-arrange the colors in the chosen color scheme. It will be appreciated that color handler 20 may be invoked via scheme picker 5, color picker 3 or via an additional user interface and may offer to designer 2 different ways to modify the chosen scheme or color. It will be further appreciated that there may be a uniform data structure throughout system 100 and that each operant of color handler 20 may use standard parameters to run their algorithms as described in more detail herein below. It will also be appreciated that each color scheme may be made up of a predetermined number of principal colors and a predetermined number of associated subordinate colors per principal color.

As discussed herein above, system 100 may provide a platform via interface 10, color scheme picker 3 and color picker 5 for designer 2 to modify a current color scheme within the context of a particular component. Designer 2 may modify a color scheme by editing one or more of its cells which may be a principal color, a subordinate color or both. Modifications may be further made using brightness handler 21, invertor 22, unifier 23, column updating handler 24 and overrider 26 as described in more detail herein below. During the modification stage, when designer 2 may experiment with different schemes and colors, the current modification may be stored in database 70 which may hold "the last color used", as well a log of the modifications performed by the designer 2. In this scenario, designer 2 may constantly use the undo/do operators until a final scheme or color is chosen.

It will be appreciated, that once designer 2 has finished making his modifications using color handler 20, color processor 30 may process any changes made and may apply them to the component in question. Color processor 30 may then instruct database coordinator 40 to store the changes to color scheme and style in database 50. It will be appreciated that database coordinator 40 may retrieve the updated scheme and style from database 50 whenever the pertinent component is used by designer 2.

Figure 9:
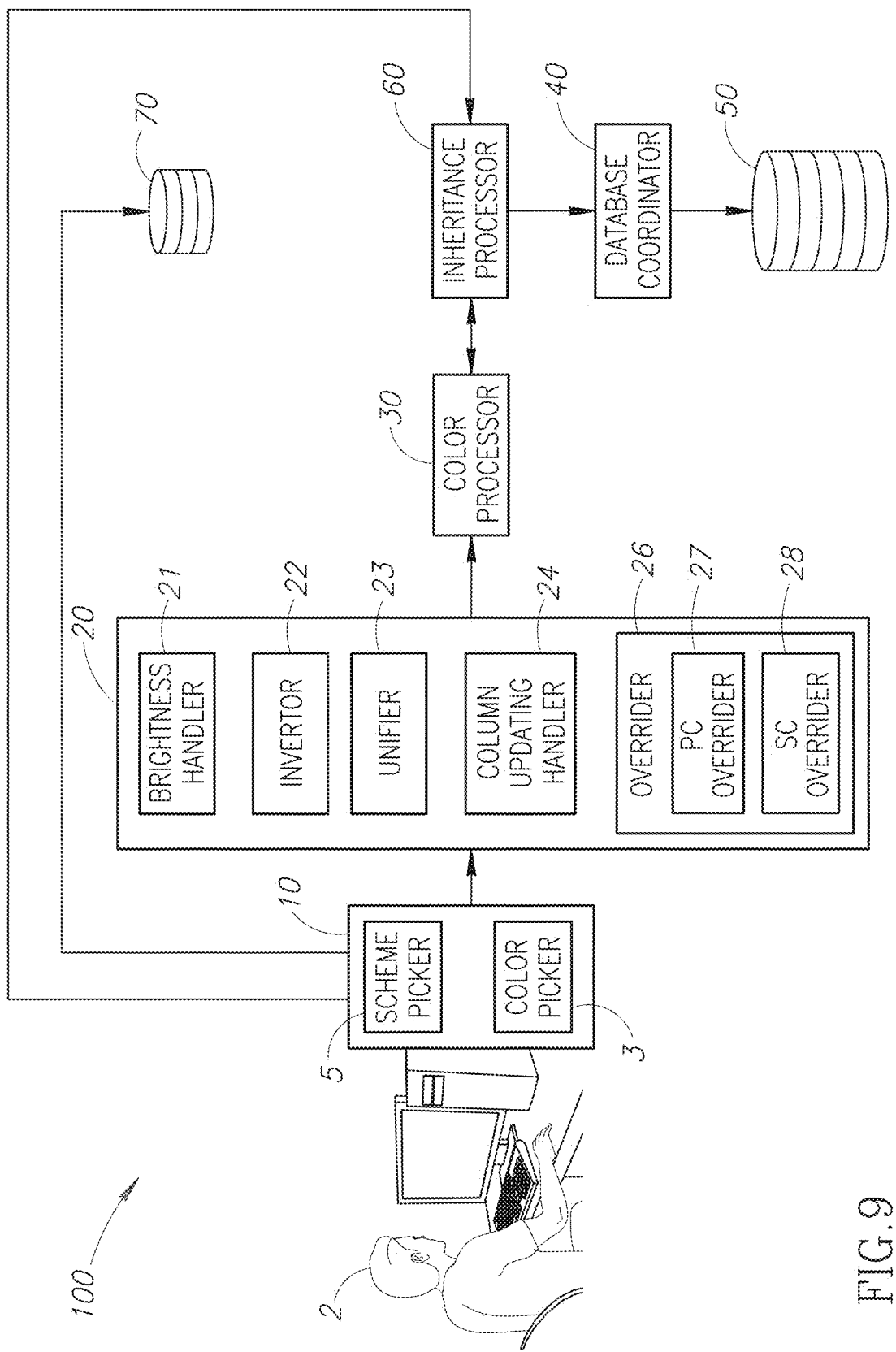
FIG. 9 is a schematic illustration of an alternative embodiment to the system of FIG. 8, designed an operative in accordance with an embodiment of the present invention.

In an alternative embodiment to the present invention as illustrated in FIG. 9 to which reference is now made, system 100 may comprise an inheritance processor 60. This may be implemented in document editing systems that have a defined inheritance hierarchy. Inheritance processor 60 may ensure that a change of color scheme and/or color is inherited between lower level and higher level documents. Once designer 2 has finished his modifications, color processor 30 may call upon inheritance processor 60 to store the modifications as parent modifiers in the case where the component in question has a dependent. Inheritance processor 60 may store this information in database 50 via database coordinator 40. Inheritance processor 60 may also instruct color processor 30 to apply any modifications when loading a component whose "parent" has been modified and the changes to color may also affect it. This could happen for example when loading a record even when a designer is not involved, such as loading a displayed page for an end user.

It will be appreciated that system 100 may implement exceptions to the inheritance architecture which may also be held in database 50 so that not all modified color schemes are automatically inherited. For example, inherited elements for which a separate, specific color scheme has been specified may be excluded. Scheme picker 5 may also add as part of its dialog with the designer, an option for changing the color scheme for the current component only without affecting any components inheriting from the current component.

Figure 10:
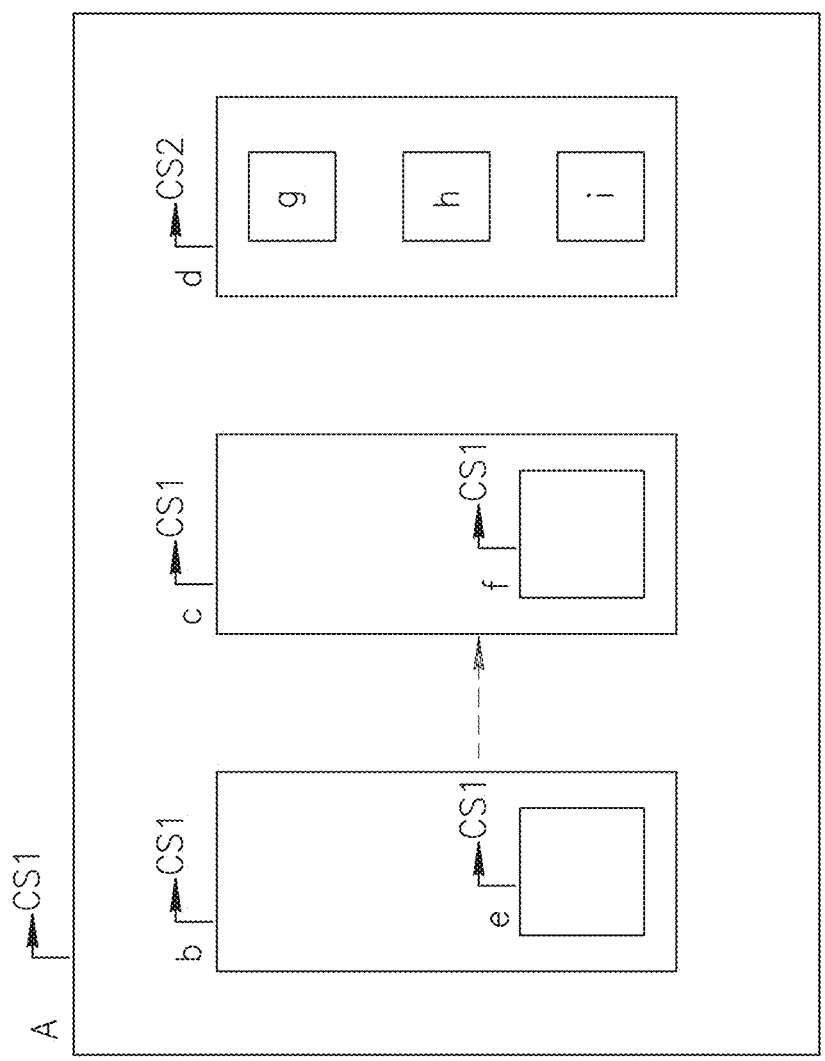
FIG. 10 is a schematic illustration of a container color scheme modification and color scheme switching affecting contained/inherited components.

Reference is now made to FIG. 10 which illustrates an example of how color scheme modification and color scheme switching can affect contained/inherited components. Document page A has been associated with the color scheme CS1 (e.g. directly or through an entire-document association). Document page A contains the container [b] and another container [c] which is a duplicate of container [b] and inherits from it. Therefore container [b] and container [c] are automatically associated with CS1. If designer 2 selects the color red from CS1 as the frame color of container [b], the same red color would also be used for the frame color of the inheriting container [c]. Designer 2 then creates another rectangle element [e] within the container [b] and selects the color blue from the color scheme CS1 as the frame color for [e]. The inheriting container [c] now displays a matching contained rectangle element [f], associated with CS1 and using the same blue color from CS1. Designer 2 then creates another container element [d] inside page A, but associates it with the color scheme CS2. He also creates a number of contained rectangles [g], [h] and [i] within container [d]. Rectangles [g], [h] and [i] are automatically associated with CS2. Designer 2 selects the color blue from CS2 as the frame color for [d], [g], [h] and [i]. It will be appreciated that if designer 2 were to switch the color scheme associated with the document page A (from CS1 to CS3), the color red (used for the frames of [b] and [c]) and the color blue (as used for the frames of [e] and [f]) would be replaced by the colors occupying the same places in the new color scheme CS3. However, the color blue (as used for [d], [g], [h] and [i]) would not change, as this is "the blue from CS2" and not "the blue from CS1". The two might be identical shades of blue or not—it does not matter for this case, as the assignment is based on the logical association and not on the color value.

Figure 7:
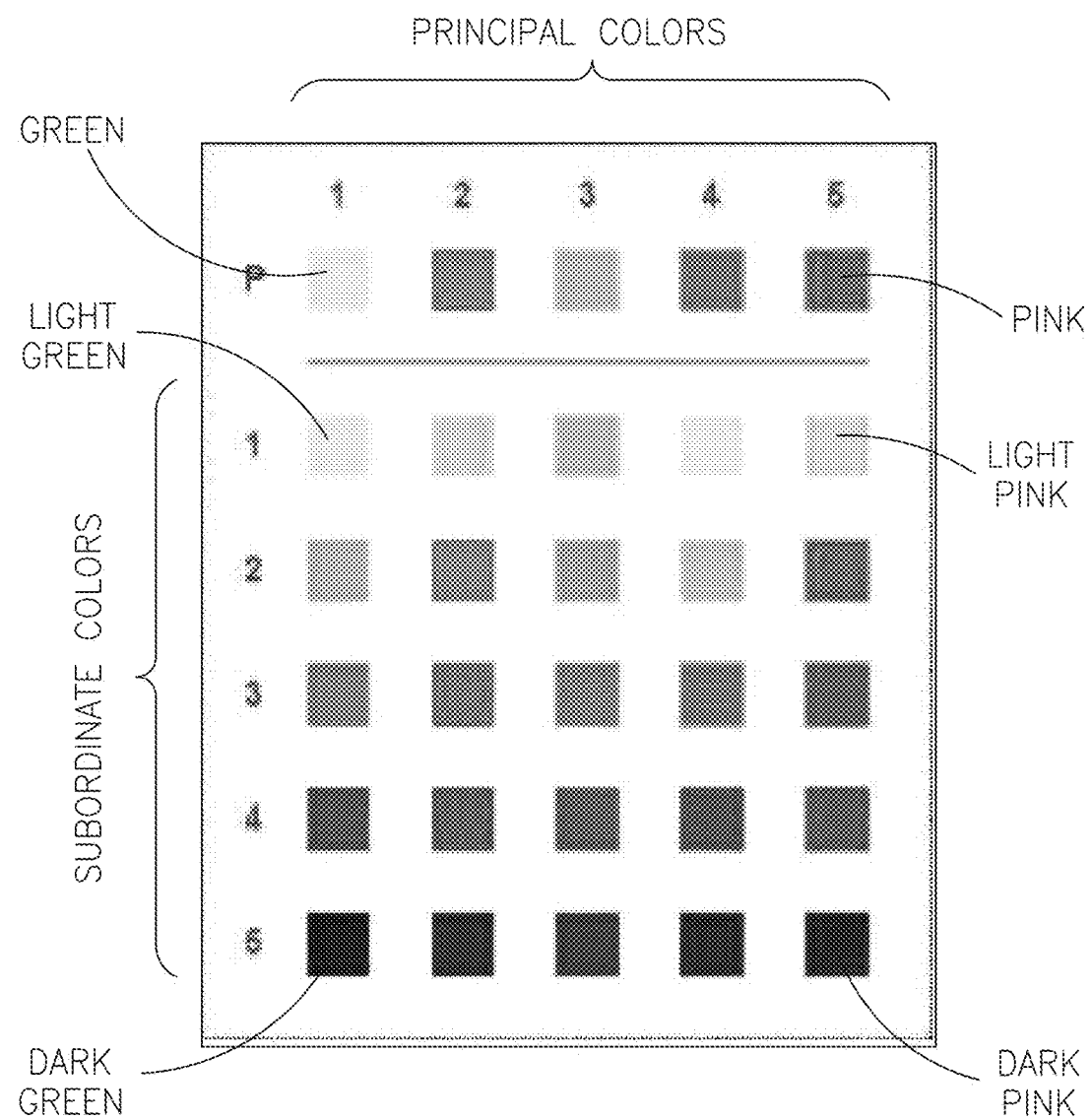
FIG. 7 is an example of a basic color scheme matrix.

As discussed herein above, color handler 20 may allow designer 2 to modify his chosen color scheme and/or color. It will be appreciated that at this stage a single color scheme may be altered by modifying a single cell, multiple cells or by performing a global color scheme operation. It will be further appreciated that color handler 20 may create a local variant of the color scheme which may apply only to the current component. As discussed in the background, when designer 2 picks a particular color from a color scheme via color picker 3, the color picked may have a given coordinate formed by the row and column of the color scheme matrix as is seen in FIG. 7. For example light green may have the coordinate [2, 3]. It will also be appreciated that a change to a single cell may automatically affect its surrounding cells, typically the adjacent subordinate colors in the same column or the subordinate colors for a modified principal color. It will be further appreciated that once a particular color chosen from a picked scheme has been applied to a component, the coordinate of that color is saved. Therefore if designer 2 further modifies the current color scheme, the current coordinate currently assigned may take its color from the same position within the new color scheme.

It will also be appreciated that color handler 20 may perform modifications at the root color scheme level, so that if a particular color scheme is modified in one context, all of its uses in other contexts (e.g. other styles, other elements etc.) are equally affected. These changes may be made at document level or at system level. For all of these operations, interface 10 may preview to designer 2 the changes such as the actual color to be assigned to the color scheme based on the modification operands of color handler 20 as described in more detail herein below and the effect of the color scheme modification on other cells within the same color scheme or the effect of the color scheme modification on the document elements whose colors are affected. It will be appreciated then when editing a root color scheme, the change is made to the actual color scheme involved.

It will be appreciated that if color handler 20 changes the color scheme for a container-type element, the newly selected current color scheme may be the one used for the document elements contained in the given container element, including elements which are directly contained as well as elements which are indirectly contained (e.g. elements contained within elements contained in the container).

Figure 11:
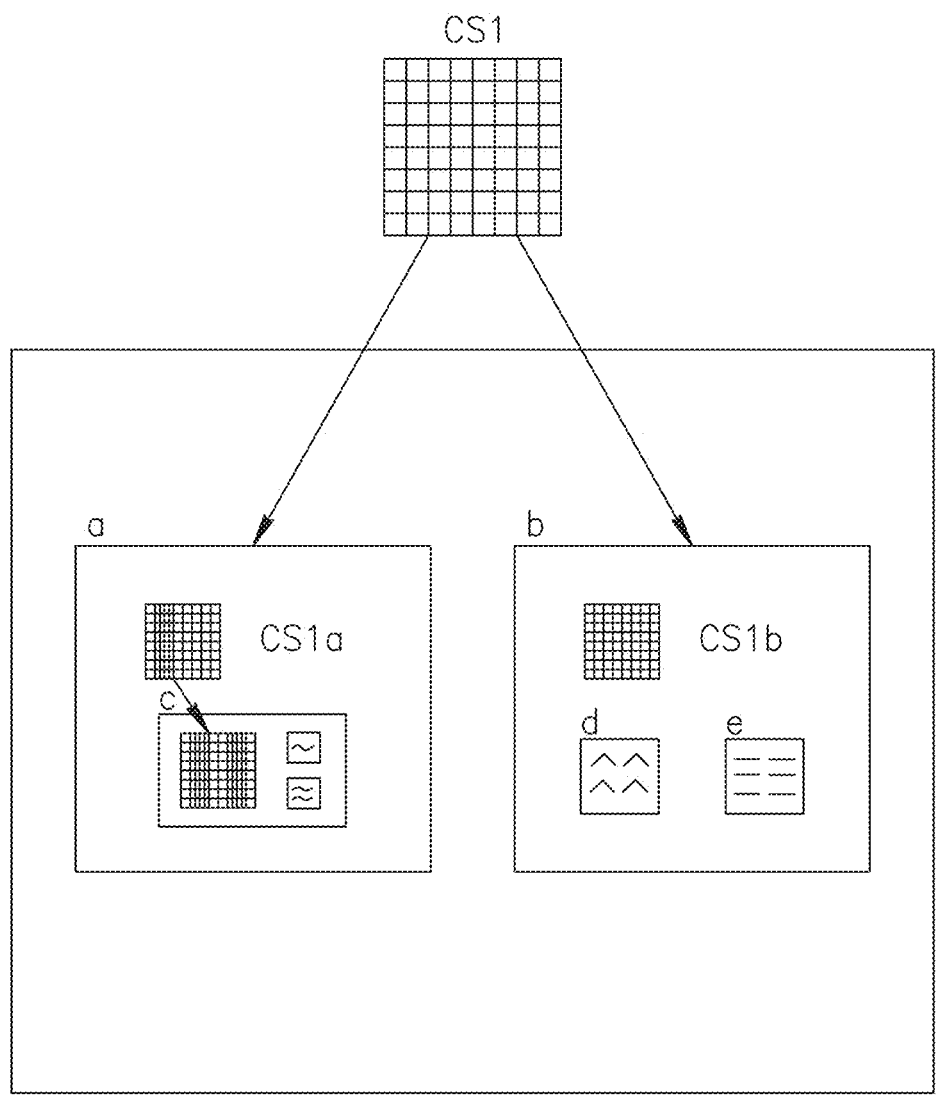
FIG. 11 is a schematic illustration of container color scheme modification performed in a specific context.

Reference is now made to FIG. 11 which illustrates the modification of a color scheme within a particular context. Color Scheme 1 (CS1) is used for container elements [a] and [b] as well as for container [c] which is located within container [a]. Designer 2 may make a modification to container [a] in which the second column of CS1 is set to various shades of red. The new modified color scheme (CS1*a*) is also applicable to container [c]. Designer 2 may make a further modification to CS1*a* in which the fourth column of CS1*a* is set to various shades of green. Designer 2 may then modify container [b] separately so that the second column of CS1 is set to shades of blue, with the newly modified CS1 version now known as CS1*b*. The modified CS1*b* may also be used by contained elements [d] and [e]. It will be appreciated that there is no connection between the modifications to the second column of CS1 made to containers [a] and [b]. Each modification applies to its own context only.

It will also be appreciated that when modifying a non-root color scheme (i.e. changing the color of the current color scheme), overrider 26 may create a local modification called an override to the specific color scheme matrix or cells. An override to a principal color may be known as a PC-override and an override to a subordinate color may be known as an SC-override. It will be appreciated that since changes to a principal color may also affect the pertinent subordinate colors, a PC-override may also invoke one or more SC-overrides. As discussed herein above, overrider 26 may further comprise of principal color overrider 27 and subordinate overrider 28. Principal color overrider 27 may assign a new value to a principal color cell. Since changing the principal color affects the subordinate color, principal color overrider 27 may implement different subordinate column generation algorithms to handle this as described in more detail herein below.

It will also be appreciated that overrides may be additive, so that if a color scheme is modified in one context (i.e. a specific container), changes made to a lower level within the context (such as a component within the container), may be reapplied to the modified color scheme.

Subordinate color overrider 28 may assign the value chosen by designer 2 to a subordinate color cell or may modify the requested subordinate cell value before assigning it to a cell. Subordinate overrider 28, may also create color blend sequences when there are multiple overrides in the same subordinate color column.

It will be appreciated that an override may be absolute and may create a new color for a particular cell or may be relative i.e. part of the color such as the saturation or lightness is modified. Therefore overrider 26 (either via principal color overrider 27 or subordinate color overrider 28 depending on the type of color being modified) may perform either a relative or an absolute override. Overrider 26 may create an absolute override by selecting a new color for a color scheme matrix cell which may be selected independently of the current color in that cell. Overrider 26 may then calculate the actual color of the cell as described in more detail herein below. Overrider 26 may create a relative override by modifying only the saturation and lightness or the perceived brightness values for the existing colors of the given cell, while keeping the hue constant.

Figure 12:
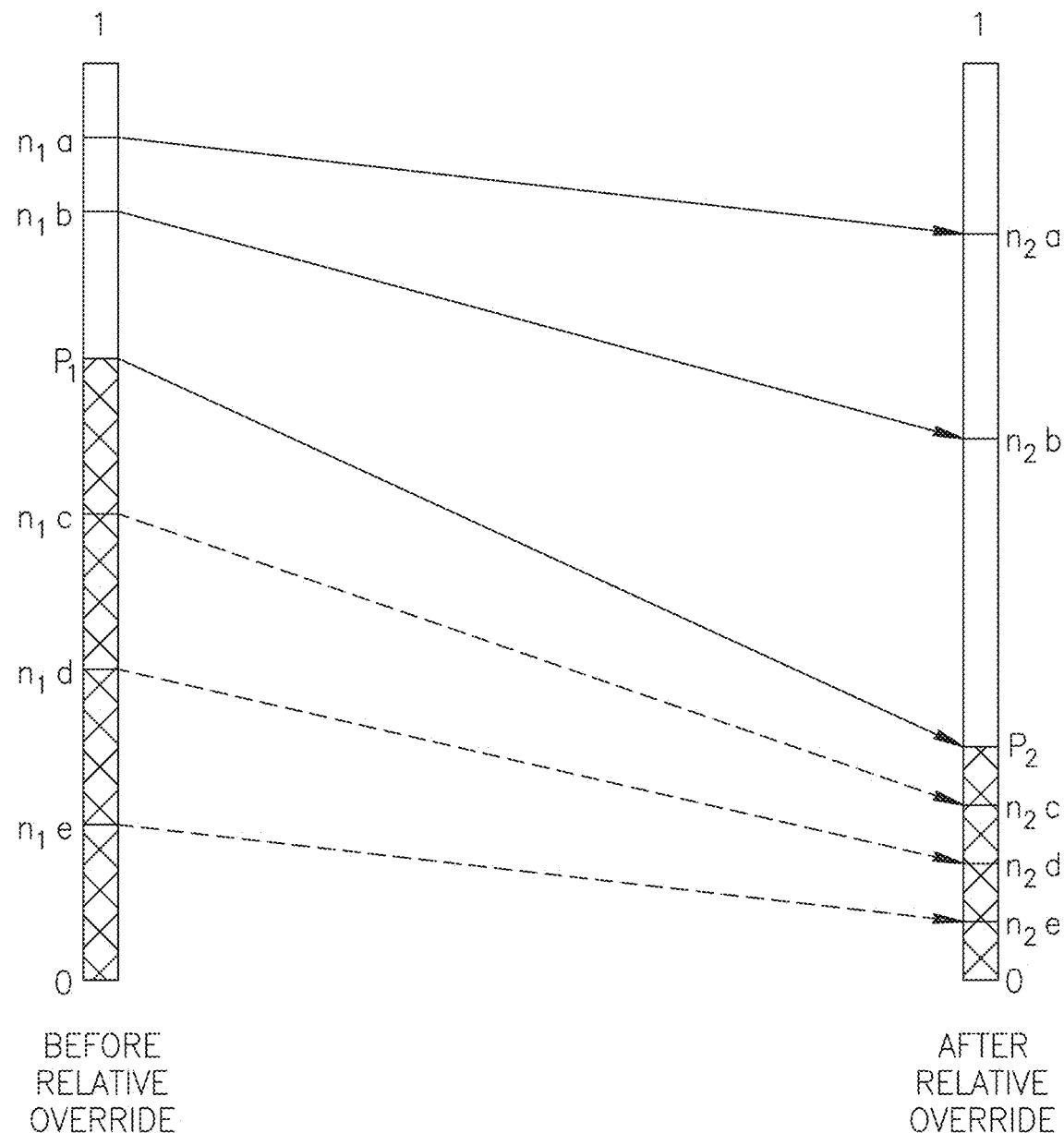
FIG. 12 is a schematic illustration of the use of linear range mapping when re-applying a relative override to saturation, lightness and perceived brightness values.

It will be appreciated that in a relative override, overrider 26 may modify the target saturation, lightness or perceived brightness using a linear range mapping. For example, if the original color had a perceived brightness of p1 and designer 2 modifies it to a perceived brightness of p2, overrider 26 may map the ranges [0 . . . p1], [p1 . . . 1] to [0 . . . p2], [p2 . . . 1] as is illustrated in FIG. 12 to which reference is now made. As can be seen [0 . . . p1] is a large range whereas [p1 . . . 1] is a smaller range. If designer 2 modifies the parent color scheme further so that the inherited color for this cell now has a perceived brightness of n1 instead of p1, overrider 26 may calculate a new modified color so that the new resulting perceived brightness value n2 would be:

If $n1<p1$: $n2=n1*p2/p1$

If $n1>p1$: $n2=1-(1-n1)*(1-p2)/(1-p1)$

Where:
  p1 is the PB (perceived brightness) value of the original color;
  p2 is the PB value of the new (override-modified) color;
  n1 is the PB value of a color to be mapped using the linear range mapping;
  n2 is the PB value of a color which was mapped using the linear range mapping;

Thus n1*a*, n1*b* are close together before the override and further apart as n2*a* and n2*b* after the override whereas n1*c*, n1*d* and n1*e* are further apart before the override than after. The same would apply for saturation and lightness as appropriate.

In order to perform a relative override, overrider 26 may request brightness handler 21 to calculate a perceived brightness value. It will be appreciated that in this scenario, the override is defined in term of target perceived brightness; thus the override 26 needs brightness handler 21 to calculate the HSV color parameters needed to generate the given perceived brightness. As discussed herein above, different hues may provide different perceived brightness values for the same lightness value. Brightness handler 21 may calculate the HSV color parameters needed to generate the given perceived brightness by searching for the correct lightness value which provides the given perceived brightness value. The perceived brightness value is typically calculated using a RGB-formula which gives different weights to different hues such as described in the W3c organization's working draft on accessibility. (http://www.w3.org/TR/AERT#color-contrast). Brightness handler 21 may also perform a reverse calculation of perceived brightness to lightness value.

Applicants have realized that for any given hue and saturation value, perceived brightness as a function of lightness is a monotonic function which always increases from [0,0] to [1,1]. A monotonic function (or monotone function) is a function between ordered sets or number ranges that preserve the given order. Thus a searching algorithm may be used to find the right lightness value which creates a given perceived brightness value. Applicants have also realized that although any array searching algorithm may theoretically be used (such as a binary or interpolation search), the algorithm must be adapted to search over a real valued function taking a real valued argument. Since the required perceived brightness value is used for display on a discreet-pixel-depth-display, the lightness value is only required to a given resolution. For example, for a typical display which may allow 8-bit R/G/B values, the lightness value is really in the range 0 . . . 255 and thus a binary search would finish in up to log 2(256) steps, i.e. in up to eight steps at the most.

Therefore brightness handler 21 may use the search algorithm:

$$Lgt=Lgt\text{-from-}PB(Hue,Sat,\text{Requested-}PB)$$

Where hue and sat are the hue and saturation of the sought after color; Requested-PB is the target perceived brightness value for the sought after color and Lgt is the lightness value which should be used (together with Hue and Sat above) in specifying an HSL color value which has the target perceived brightness value.

As discussed hereinabove, subordinate color overrider 28 may apply a new color to a subordinate color cell. Subordinate color overrider 28 may assign the exact color chosen by designer 2 or may modify the requested subordinate color value before assigning it to the cell. In the case of the latter, subordinate color overrider 28 may calculate the actual color to be assigned (AC) from the existing subordinate color (EC) and the new color requested by designer 2 (NC). It will be appreciated that the hue of the actual color to be assigned (AC) may be the same as that of the color selected by designer 2 i.e. Hue (AC)=Hue (NC). The saturation of the actual color, may be the weighted average of the saturation (Sat) of the existing subordinate color (EC) and the saturation (Sat) of the new color (NC) i.e.:

$$Sat(AC)=\text{weighted\_average}(Sat(NC),Sat(EC)).$$

Subordinate color overrider 28 may further calculate the lightness value in order to allow designer 2 to use his new chosen color and to also keep the new color similar and in context to the previous value of the subordinate cell and nearby cells. Subordinate color overrider 28 may set the lightness value of the actual color to be assigned (AC) to the weighted average of the lightness of the existing subordinate color (EC) and the lightness of the new color requested by designer 2 (NC):

$$Lgt(AC)=\text{weighted\_average}(Lgt(NC),Lgt(EC)).$$

In an alternative embodiment, subordinate color overrider 28 may also calculate the lightness value in order to provide a perceived brightness color (as described herein above) which may be the weighted average of the perceived brightness of the existing subordinate color (EC) and the perceived brightness of the new color (NC):

$$Lgt(AC)=Lgt\text{-from-}PB(Hue(AC),Sat(AC),\text{weighted\_average}(PB(NC),PB(EC))).$$

It will be appreciated that for the above mentioned equations, the weights used may be system parameters or may be determined by designer 2.

It will also be appreciated that when subordinate color overrider 28 modifies a subordinate color cell, color handler 20, may also instruct subordinate color overrider 28 to automatically modify (override) any neighboring cells to maintain consistency between the shades of color. Subordinate color overrider 28 may create a color blend sequence in the subordinate color column (as seen in FIG. 7), for any combination of absolute or relative overrides. Subordinate color overrider 28 may further create a color scheme column which includes a multipoint color gradient between the subordinate color overrides taking into account any pre-existing overrides and the latest override currently requested by designer 2.

Figure 13:
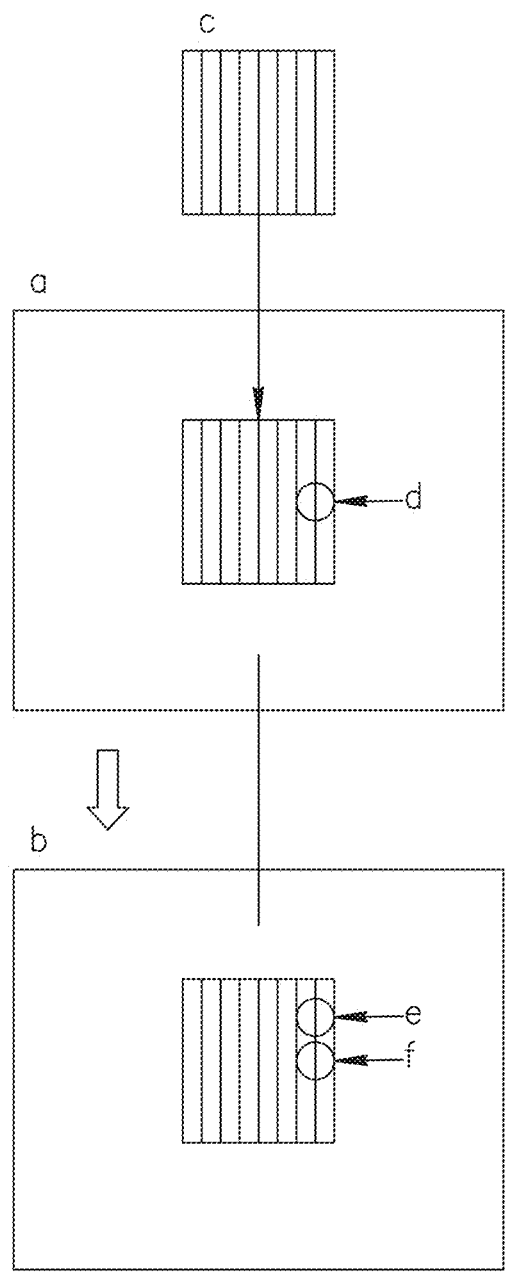
FIG. 13 is a schematic illustration of subordinate color overrides at multiple inheritance levels.

For the purpose of discussion, all subordinate color overrides that are added to the given color scheme are applied along the entire inheritance path from the root definition for the pertinent color scheme. Reference is now made to FIG. 13 which illustrates an example of subordinate color overrides at multiple inheritance levels. As is shown, style definition [b] inherits from the style definition [a]. Style definition [a] uses the root color scheme [c], but modifies it with the subordinate color-override [d]. Style definition [b] further modifies the inherited version of [c] with another subordinate color-override [e] (in addition to the subordinate color —override [f] which is the inherited version of [d]). Thus, in the context of the style definition [b] the color scheme [c] would have two subordinate color —overrides— [e] and [f].

In order to create this blend, subordinate color overrider 28 may regard any existing subordinate color —overrides as anchor points in a 3-dimensional color space and a 3-D curve is created between them (herein call the gradient curve). This algorithm may use the regular RGB color space, or a non-cylindrical version of any of the angular color spaces (HSV, HSL, HSB, etc.).

The curve fitting process may use simple set of straight lines in 3D between the anchor points, or any known algorithm for curve fitting, such as smooth polynomial (spline) interpolation, Bezier spline or any other algorithm. Color handler 20 may specify the degree of smoothness (e.g. the polynomial fitting order) as a parameter. The higher degree/more complex curve fitting algorithms are typically only useful if there are a large number of subordinate colors per principal color—otherwise the difference from straight-line interpolation is not noticeable.

Figure 14:
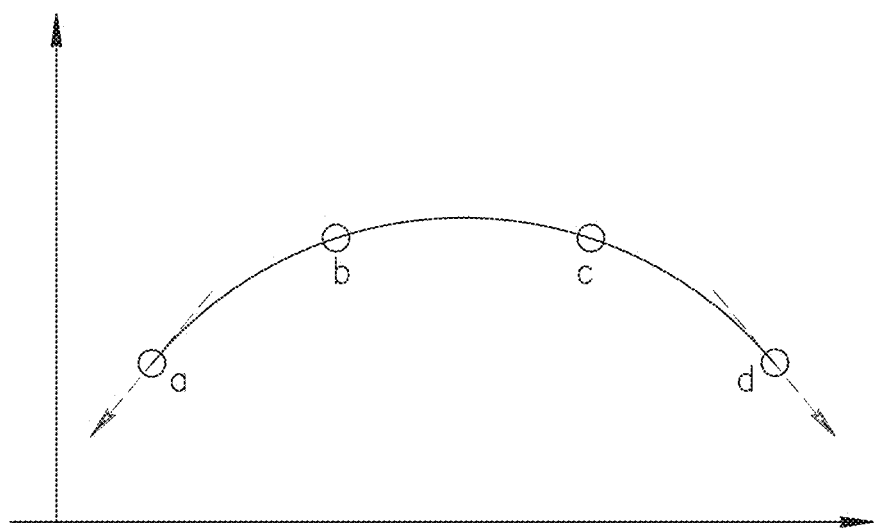
FIG. 14 is a schematic illustration of a two dimensional representation of curve fitting process for existing subordinate color—overrides.

It will be appreciated that when there is no anchor for the first or last point, subordinate color overrider 28 may continue the gradient curve in straight line in either side using the same direction as the one in which the curve reaches this edge point. This can be visualized in 2 dimensions as illustrated in FIG. 14 to which reference in now made. As is shown, a smooth gradient curve is fitted to the points [a], [b], [c] and [d] and is continued in both sides as a straight line having the same slope as the part of the curve reaching the terminal points [a] and [d].

In an alternative embodiment, subordinate color overrider 28 may apply curve-fitting only to the subordinate colors between the two extreme subordinate colors which have subordinate colors —overrides, and not apply it to subordinate colors' outside of this range.

In yet another embodiment, subordinate color overrider 28 may use the first and last subordinate colors as anchor points anyway, even if there is no subordinate colors —override specified for them.

An example of this is when designer 2 may request to override the top subordinate color with the color A (e.g. blue) and the bottom subordinate color with the color B (e.g. pink), the subordinate color column would then include a series of blend colors between A and B (e.g. a blue-to-pink gradient).

Once subordinate color overrider 28 has calculated the gradient curve, it may calculate the color values for subordinate colors which are not anchor points (i.e. do not include a subordinate color —override) based on the gradient curve. Subordinate color overrider 28 may calculate these values via a number of gradient curve quantization methods, such as those described herein below, although any acceptable method for 3D interpolation may be used.

Figure 15:
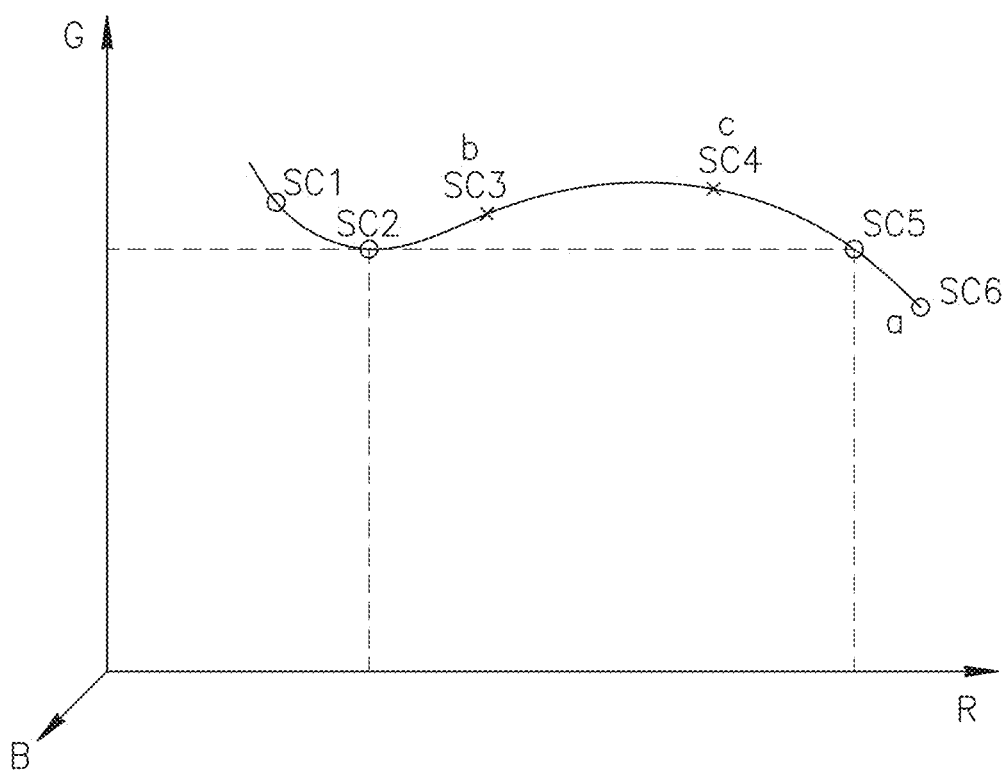
FIG. 15 is a schematic illustration of color curve quantization by cutting the curve into equal-length parts.

Reference is now made to FIG. 15 which illustrates color curve quantization by cutting the curve into equal-length parts which illustrate this method in 2 dimensions with the axes being the Red and Green axes of the RGB color space. In this example, there is a subordinate color-override specified for subordinate colors SC[1,2,5,6] in a configuration having six subordinate colors for each principal color.

Subordinate color overrider 28 may calculate the gradient curve [a] between the 4 spatial points for SC[1,2,5,6]. Subordinate color overrider 28 may then add two additional color points [b] and [c] on the curve [a] for SC3 and SC4 (between SC2 and SC5). Subordinate color overrider 28 may then calculate the total distance along the curve [a] between the points for SC2 and SC5, finding the points [b] (at ⅓ of the total distance) and [c] (at ⅔ of the total distance).

It will be appreciated that subordinate color overrider 28 may perform this calculation along the graph, rather than along any of the axes or a combination thereof since—as can be seen from the example—the curve can change its slope in any axis and even reverse direction between two anchor points. It will also be appreciated that subordinate color overrider 28 may have to perform multiple such interpolations-for example, if specific subordinate color anchors were specified for SC1, SC3, SC5 and SC6 in the example above, subordinate overrider 28 may have to interpolate SC1 and SC3 to calculate SC2, and also interpolate SC3 and SC5 to calculate SC4.

In an alternative embodiment, subordinate color overrider 28 may apply perceived brightness cutting. It will be appreciated that this method is only applicable (and advisable) when the gradient curve has identical (or at least very close) hue values at both end-points and the perceived change along the gradient curve is monotonic. In this scenario, when interpolation is required, the perceived brightness (PB) values for both end-points are calculated (in the example in FIG. 14 above these would be PB(SC2) and PB(SC5)) to create the PB value interval [PB1 ... PB2].

Subordinate color overrider 28 may then divide the perceived brightness value into the required number of equal parts (e.g. if a single middle point is required, it may use (PB1+PB2)/2) and calculate the points along the gradient curve which have the relevant perceived brightness values. This can be done using a binary search along the curve, interpolation-based search or any other method known in the art.

It will be appreciated that changes to subordinate color cells due to the modifications discussed herein above may not be regarded as separate subordinate color overrides by themselves. However, relative subordinate color overrides along the way, as well as absolute subordinate color overrides applied using the weighted average method as described herein above, may be changed if the underlying subordinate color value was modified due to the process above.

As discussed herein above principal color overrider 27 may apply a new color to a given principal color in a color scheme matrix cell. It will be appreciated that a change to a principal color may automatically change any associated subordinate colors (i.e. the entire column). Principal color overrider 27 may handle these changes as described herein below.

As described herein above, color schemes typically include in each column (i.e. for each principal color) a series of variations of the principal color, such that a wide range of perceived brightness values are provided in the same column, and that the perceived brightness level across the rows (i.e. in the same position in all columns) is relatively uniform. This is done so to preserve sufficient perceived brightness separation between the rows—so that an element colored with a row-4 subordinate color (for example), may stand out on a background colored with row-2 subordinate color (for example) for any choice of foreground (row-4 subordinate color) and background (row-2 subordinate color) colors from the color scheme.

However, this uniformity across the rows conflicts with the ability to specify arbitrary subordinate color-overrides, although (as noted above), subordinate color overrider 28 may modify a requested subordinate color override to make it more compliant with the row's perceived brightness range.

It will be appreciated that root color schemes may be initially created with a full range of perceived brightness values. For example, a given 5-element column will typically contain variations (tints and shades) of the principal color having the perceived brightness values 0.1, 0.3, 0.5, 0.7 and 0.9. It will be appreciated that there is no need for the variations with perceived brightness values of 0.0 and 1.0— which are simply black and white respectively.

It will also be appreciated that principal color overrider 27 may apply a Subordinate Color Column Generation algorithm (SCCG algorithm for short) to create a subordinate color column with a set of variations of the principal having appropriate perceived brightness values.

It will also be appreciated that there may be multiple versions of the SCCG algorithm, depending on the number of anchors in the generated column i.e. the number of subordinate cells which are set to the exact value specified for the principal color (or in the inverted opposite color as defined below). This number may be 0, 1 or 2—and thus there are 0-anchor, 1-anchor and 2-anchor versions of the SCCG algorithm as is described in more detail below. Principal color overrider 27 may use a 0-anchor algorithm if designer 2 may select from both the principal color and subordinate values, and therefore there is no requirement to create any anchor subordinate color to reflect the principal color. Principal color overrider 27 may use a 1-anchor algorithm in a system which only allows subordinate color selection and does not support invertor 22. Principal color overrider 27 may use a 2-anchor in a system which only allows subordinate color selection and does support invertor 22. The functionality of invertor 22 is described in more detail herein below.

Figure 16:
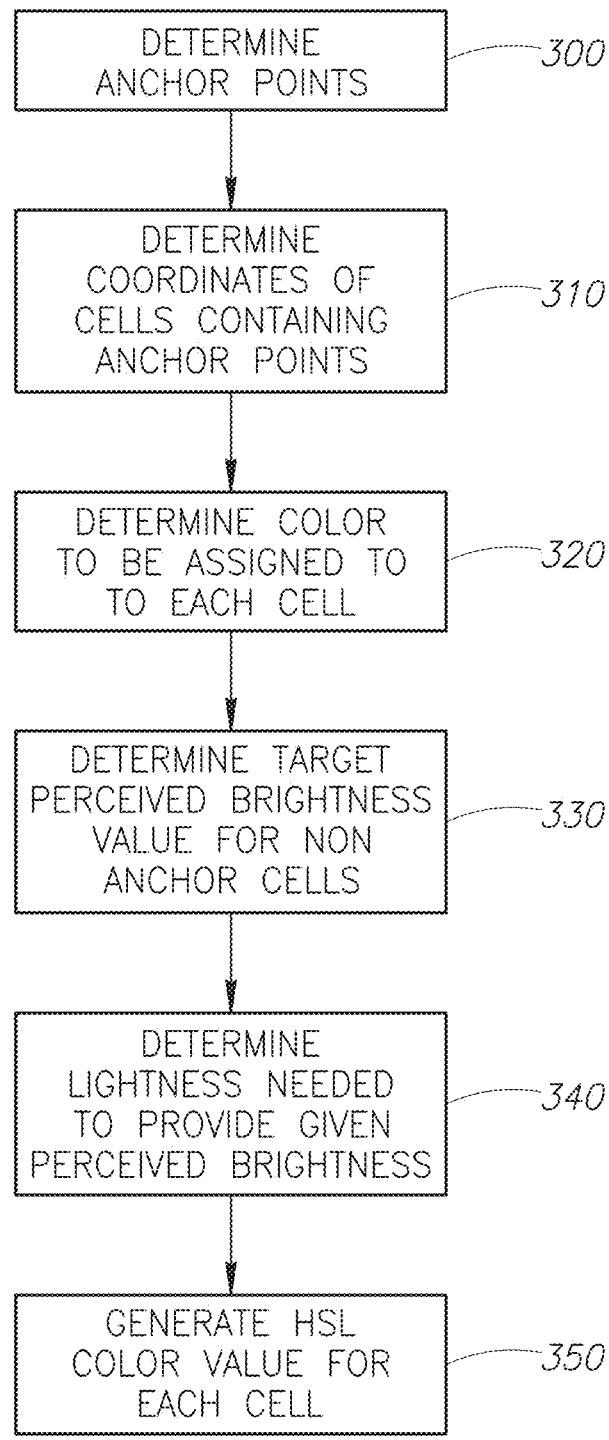
FIG. 16 is a flow chart of the common processes of any subordinate color column generation algorithm.

Reference is now made to FIG. 16 which illustrates a flow chart of the common processes applied by principal color overrider 27 when running any version of a SCCG algorithm. First any anchor points are determined (step 300). Next determine the coordinates of the cells containing anchor points (step 310); Next determine the exact color to be assigned to each of the cells containing anchor points (step 320). Then determine the target perceived brightness value for all other (non-anchor) cells in the column (step 330) possibly based on interpolation or extrapolation of the perceived values of the anchor points. Given the hue and saturation values for each cell as noted below, determine the lightness needed to provide the given perceived brightness (step 340) in each cell, and generate the HSL color value for the cell (step 350).

In all versions of the SCCG algorithm, all generated subordinate values use the hue specified for the new principal color value. There are a number of ways to determine the saturation for the generated subordinate values (which are used in all versions of the SCCG algorithm): The anchor cells (if any) use the exact saturation of the principal color. One option for the non-anchor cells is to still use the same principal color saturation, i.e. lock the saturation for the entire column to the same value.

An alternative algorithm for the non-anchor cells is to vary the saturation at the extreme perceived brightness points, so that the cells which should have higher perceived brightness values are calculated based on a higher saturation. This way, achieving the required perceived brightness may not require extreme lightness values (which may make the cell color be very close to black or white).

It will also be appreciated that in all versions of the algorithms as described in detail herein below, principal color overrider 27 may generate a subordinate color column of increasing perceived brightness values (i.e. going from dark to light). It will be appreciated that all of the algorithms can also be modified so to generate a subordinate color column of decreasing perceived brightness values (i.e. going from light to dark). Color handler 20 may define the perceived brightness or saturation and lightness value progression direction (i.e. going up or down) based on the current progression in the affected subordinate color column (i.e. PB(SC[first]) vs. PB(SC[last]))).

It will be further appreciated that for all versions of the SCCG algorithm, principal color overrider 27 may allocate a desired perceived brightness range to each cell in the column. For example, in a 5-SC system, the perceived brightness ranges and range sizes may be:

SC1: 0.0-0.2 (20%);
SC2: 0.2-0.4 (20%);
SC3: 0.4-0.6 (20%);
SC4: 0.6-0.8 (20%);
SC5: 0.8-1.0 (20%);

Therefore, each cell uses ⅕ of the available perceived brightness range. It will be appreciated that these per-cell ranges may be used, for example, by principal color overrider 27 to calculate a desired per-cell perceived brightness value (in the 0-anchor SCCG algorithm), which is the middle value of the perceived brightness range for each cell. However, the extreme perceived brightness values (close to 0/1) are typically not very relevant, since the colors having these perceived brightness values are too close to black and white to provide the relevant hue information. To resolve this, principal color overrider 27 may use a perceived brightness range division in which the first and last cells have a larger perceived brightness range then the cells in the middle. For example, in a 5-SC system with 26% first and last cell perceived brightness range, the perceived brightness ranges would be:

SC1: 0.00-0.26 (26%);
SC2: 0.26-0.42 (16%);
SC3: 0.42-0.58 (16%);
SC4: 0.58-0.74 (16%);
SC5: 0.74-1.00 (26%);

It will be appreciated that typically, a system which allows designer 2 to select a color from the color scheme from both the principal colors and subordinate colors does not need to place the exact principal color value in any of the subordinate colors in the related column, since such placement would be duplicative—the same color would be placed in two selectable regions (the principal color and the associated subordinate color).

Figure 17:
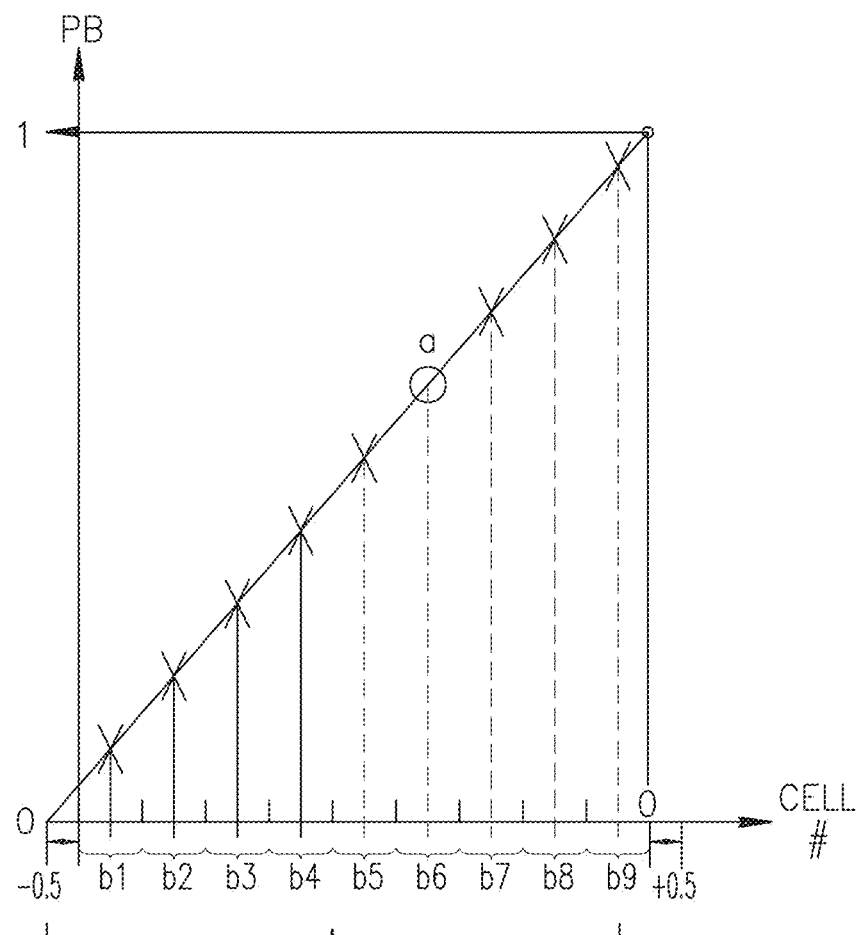
FIG. 17 is a schematic illustration of an example of perceived brightness target value assignment for a 1-anchor subordinate color column generation algorithm.
Figure 18:
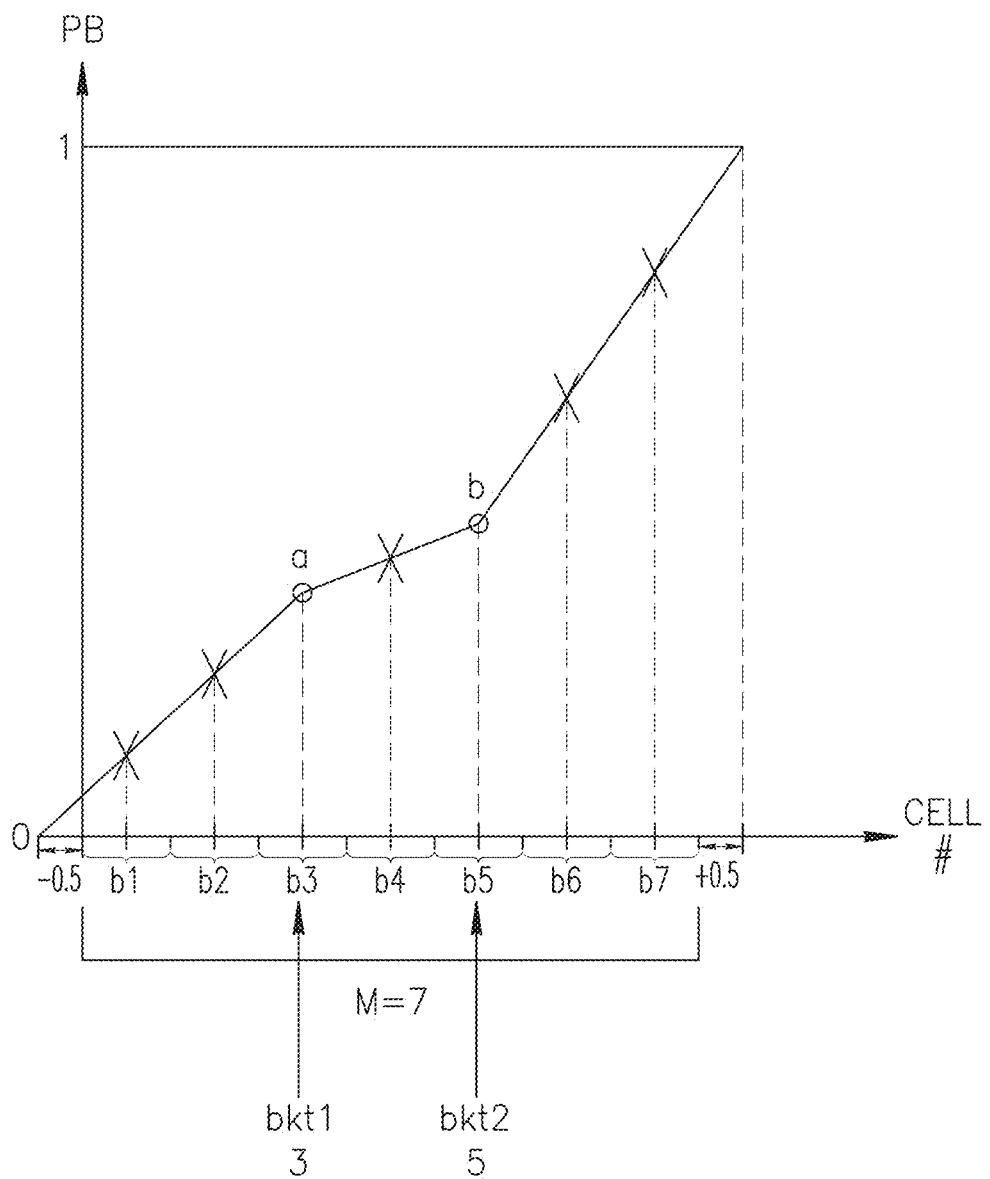
FIG. 18 is a schematic illustration of perceived brightness target value assignment for a 2-anchor subordinate color column generation algorithm.

In this scenario, principal color overrider 27 may apply the 0-anchor SCCG algorithm. In this case the subordinate column is simply filled with a set of variations of the principal color covering a desired perceived brightness range. It will also be appreciated that this range may be sub-divided into 'bucket' values as is illustrated in FIGS. 17 and 18. The algorithm in this case is:

Calculate a perceived brightness (PB) range for each cell in the column, taking into account the increased size of the first and last cell (as noted above);

Calculate a single target perceived brightness (PB) value for each cell, which is the middle value of the perceived brightness range. From the example as discussed herein above, these numbers would be:
  a. SC1: 0.00-0.26 (26%); target PB— 0.13;
  b. SC2: 0.26-0.42 (16%); target PB—0.34;
  c. SC3: 0.42-0.58 (16%); target PB—0.50;
  d. SC4: 0.58-0.74 (16%); target PB—0.66;
  e. SC5: 0.74-1.00 (26%); target PB—0.87;

Calculate the hue, saturation and lightness (HSL) value for each cell which provides the target perceived brightness value for the cell, as per the hue, saturation and target perceived brightness values given above.

It will be appreciated that principal color overrider 27 may apply the 1-anchor SCCG algorithm in systems which only allow colors to be selected from the subordinate color columns (but not from the principal color's themselves). Thus, the exact principal color value must be assigned to one of the subordinate cells (so it would be available for selection). The algorithm is:

Calculate a perceived brightness (PB) range for each cell in the column, taking into account the increased size of the first and last cell (as noted above). In the algorithm below, as well as the following algorithms, PB [ ] is the array of per-cell target PB values.

Find the cell whose PB range contains the PB value of the new PC color X. Note that this could be the first or last cell (if the selected principal color is sufficiently dark or light as appropriate), and in either case some of the cell range handling below would be irrelevant. It may be assumed that the number of subordinate color cells is M and that the index of the cell found is 'bkt' (in the range 1 . . . M).

Assign:

$PB[bkt]=PB(X)$;

Calculate a target PB value for each cell [i] in the cell range [1 . . . bkt−1] (if applicable) using the formula:

$P[i]=PB[bkt]*i/bkt$

Calculate a target PB value for each cell[i] in the cell range [bkt+1 . . . M] (if applicable) using the formula:

$PB[i]=PB[bkt]+((1-PB[bkt])*(i-bkt)/(M-bkt+1)$;

Calculate the HSL value for each cell which provides the target PB value for the cell, as per the Hue, Saturation and target PB values given above.

Reference is now made to FIG. 17 which illustrates this per-cell perceived brightness assignment as a pair of straight lines meeting at the anchor point [a] which provides the target. The first line is from the point [−0.5,0] to [a], and the second from [a] to [M+0.5,1].

Principal color overrider 27 may also apply the 2-anchor SCCG algorithm in systems which only allow colors to be selected from the subordinate color columns (but not from the principal colors themselves) and further implement invertor 22. The later requirement implies that two variations of the principal color must be placed in the subordinate cells—one containing the actual principal color, and another one containing the opposite color. The opposite color for a color X is defined herein as a color having hue(X) and saturation(X), but having a perceived brightness value of (1−PB(X)). This way, when invertor 22 performs an inversion, the right value is displayed. In this algorithm, and again assuming M cells are available in the column, if the principal color X is placed in cell bucket bkt1 (using the first two steps of the 1-anchor algorithm above), the opposite color should be placed in cell bkt2=(M+1−bkt1). Thus, for example, if M=5 and bkt1=1, then bk2=5; if bkt1=2 then bkt2=4.

It will be appreciated that in the special case in which M is odd and the bkt1 is the center cell ((M+1)/2), no opposite color may be created and the 2-anchor algorithm is in fact the same as the 1-anchor algorithm. The algorithm is:

Calculate a perceived brightness (PB) range for each cell in the column, taking into account the increased size of the first and last cell (as noted above);

Find the cell whose PB range contains the PB value of the new principal color X. Note that this could be the first or last cell (if the selected principal color is sufficiently dark or light as appropriate), and in either case some of the cell range handling below would be irrelevant. If we assume that the index of this cell bkt1 and the number of subordinate color cells is M:

If M is odd and bkt1=((M+1)/2), apply the 1-anchor algorithm above instead and finish.

Calculate the opposite color opp(X) and place it in the cell SC[bkt2] where:

$bkt2=(M+1-bkt1);$

Assign:

$PB[bkt1]=PB(X);$ $PB[bkt2]=PB(opp(X));$

If PB(X)>PB(opp(X)), exchange the contents and target PB values of the two cells SC[bkt1] and SC[bkt2];

Calculate a target PB value for each cell [i] in the range [1 . . . bkt1−1] (if applicable) using the formula:

$PB[i]=PB[bkt1]*i/bkt1$

Calculate a target PB value for each cell [i] in the range [bkt1+1,bkt2−1] (if applicable) using the formula:

$PB[i]=\text{weighted-average}(PB[bkt1],bkt2-i,PB[bkt2],i-bkt1);$

Calculate a target PB value for each cell [i] in the range [bkt2+1 . . . M] (if applicable) using the formula:

$PB[i]=PB[bkt2]+((1-PB[bkt2])*(i-bkt2)/(M-bkt2+1);$

Calculate the HSL value for each cell which provides the target PB value for the cell, as per the Hue, Saturation and target PB values given above.

Reference is made to FIG. 18 which illustrates this per-cell perceived brightness assignment as a set of two straight lines meeting at the anchor points [a] (for SC[bkt1]) and [b] (for SC[bkt2]).

It will also be appreciated that principal color overrider 27 may use an entirely different algorithm for subordinate column generation. This algorithm may only be applicable if the principal color value can be used (as in the 0-anchor SCCG algorithm above) and thus no anchor is required. In this scenario, the existing saturation and perceived brightness values of the existing subordinate column are used. Thus, the value assigned to each cell is the color using the new hue, the existing cell saturation and the same target perceived brightness as that of the existing subordinate color cell.

It will be further appreciated that subordinate color cells for which a subordinate color override is specified are often related to highly specific color choices which designer 2 may wish to assign to specific components. Color handler 20 may implement special handling for cells having existing subordinate color overrides which may be overwritten due to a principal color override applied to the same column. In order to handle a cell having subordinate color override, color handler 20 may perform any or all of the following methods. Color handler 20 may overwrite these cells (which have subordinate color overrides) with the newly generated values—just like the cells which don't have a subordinate color override, this deletes the subordinate color-override. Alternatively, color handler 20 may retain the subordinate color override values untouched, leaving their existing value. Color handler 20 may use the newly generated subordinate color values, but then may reapply the previous subordinate color override to the new subordinate color value. This could be a relative override (which would modify the saturation and lightness of the new value) or an absolute override (which would replace the cell value again, possibly re-creating a color curve as noted above). Another option may be for color handler 20 to use a combined behavior i.e. to retain absolute subordinate color overrides, but reapply relative subordinate color overrides. It will be appreciated that for all the above mentioned scenarios, color handler 20 may also prompt designer 2 on how to handle each of the existing subordinate color overrides.

It will be appreciated that color handler 20 may allow a number of cells to be modified simultaneously. These are typically subordinate colors only, so a set of subordinate colors overrides can be quickly created. For example, a relative override can be made to a subset of the cells in the color scheme (in one or more columns), increasing the saturation or perceived brightness for all of these cells at once. The same adjustment algorithm noted above is applied to each of the columns once the change is complete.

It will be further appreciated that color handler 20 may apply such a modification by multi-selecting a range of cells, and applying a modification using a particular user interface element such as a 1-dismensional or 2-dimensional band—for the adjustment of single (e.g. perceived brightness) or multiple (e.g. saturation and lightness) color attributes. Subordinate color overrider 28 may apply a subordinate color simultaneously to multiple subordinate colors using linear range mapping as defined above. The relative modification is applied to a leading subordinate color cell (changing the relevant attribute value from p1 to p2). Subordinate color overrider 28 may then map the ranges [0 . . . p1], [p1 . . . 1] to the ranges [0 . . . p2], [p2 . . . 1], and apply this linear mapping to the relevant attribute in all other affected subordinate colors.

As discussed herein above, designer 2 may use color handler 20 to make further modifications to his color selection either by changing the color scheme itself or a single color. Inverter 22 may "invert" the current color scheme so that the row order in each column is reversed. Since the columns are typically arranged (at least in the root color scheme) using a monotonic (increasing or decreasing) series of perceived brightness values, this reverses the series and thus the direction of perceived brightness increase/decrease. As discussed herein above, the color selection for a given component role is done by coordinates of the subordinate color in the color scheme matrix, and this positional assignment is retained during a color scheme inversion.

Figure 19:
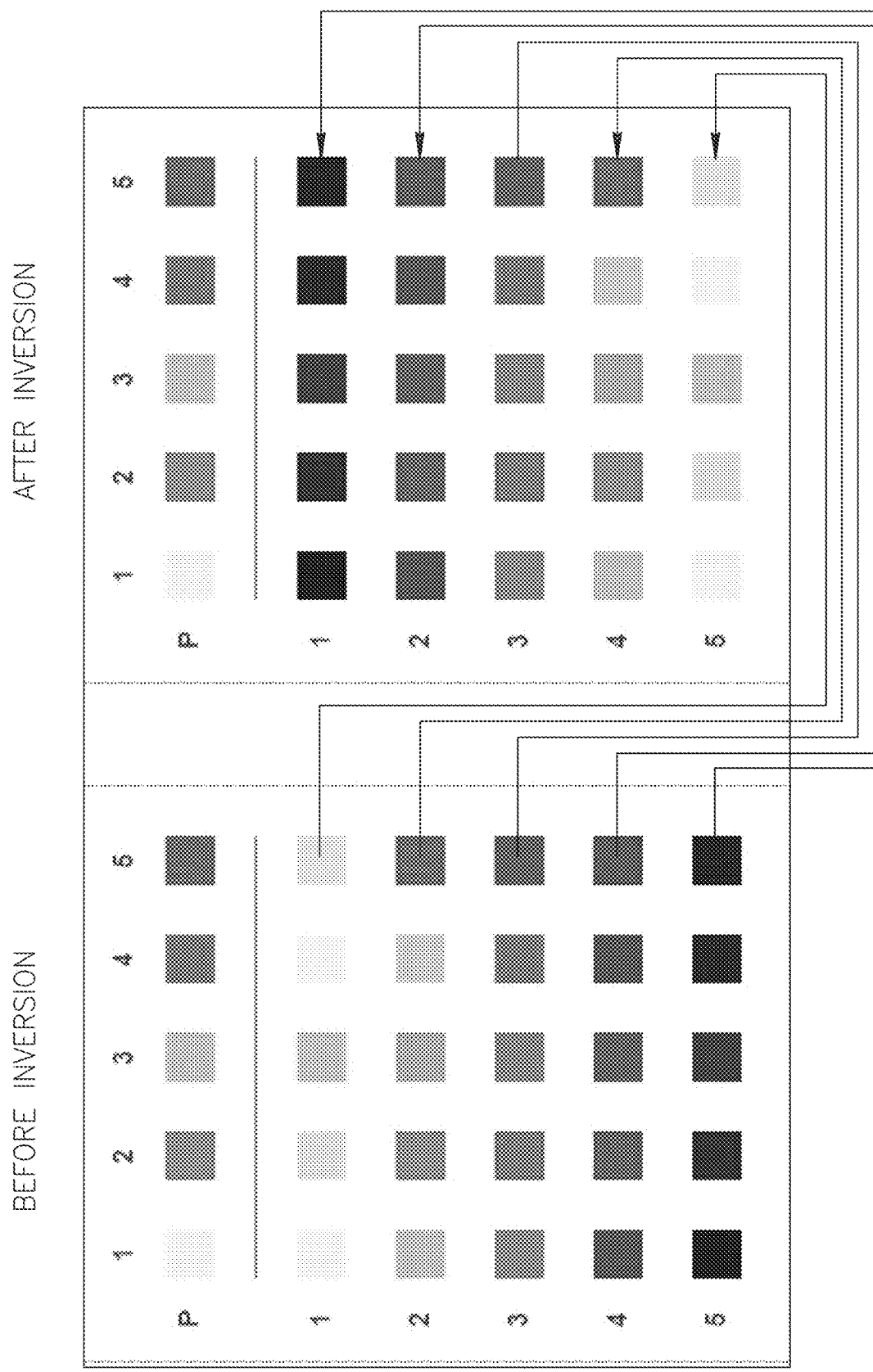
FIG. 19 is an exemplary screenshot of a color palette, before and after inversion.

Reference is now made to FIG. 19 which illustrates a color scheme inversion (before and after) for a system with five principal colors and five subordinate colors per principal color It will be appreciated that once principal color overrider 27 invokes inverter 22, the colors in the pertinent color scheme may be reversed. For example color [2,2] may go from being a lighter green to a darker green. It will be appreciated that the operation is reversible, so that invoking invertor 22 twice may restore the original values—invert (invert(CS))=CS. (CS=color scheme). The principal color for each column is retained and does not change. It will be appreciated that invertor 22 may be independent from over-rider 26 and may be kept as a generic flag for the entire color system.

It will be appreciated that unifier 23 may ensure that all cells in a pertinent row within the color scheme matrix are adapted to the same perceived brightness. Unifier 23 may calculate the average perceived brightness and then loop on all rows in the color scheme, changing the lightness value for each cell (keeping the same hue and saturation), so that all the cells within the same row have the same perceived brightness.

Column updating handler 24 may adapt a target column (or a set of such target columns) to a base column. Column updating handler 24 may be used to create uniformity (or at least similarity) between the subordinate colors positioned in the same row but in different columns in the same subordinate colors. Typically, in root color schemes, the cells in each row have a similar perceived brightness values. However, as the cells are modified by subordinate color overrider 28 along the inheritance path of the color scheme, the perceived brightness (and underlying saturation and lightness) values in the different cells in each row may diverge and it may be desirable to make them more similar to each other. Column updating handler 24 may adapt a target cell A to a base cell B by setting:

$$Sat(A)=Sat(B)$$

$$PB(A)=\text{Weighted-average}(PB(A),PB(B))$$

Figure 20:
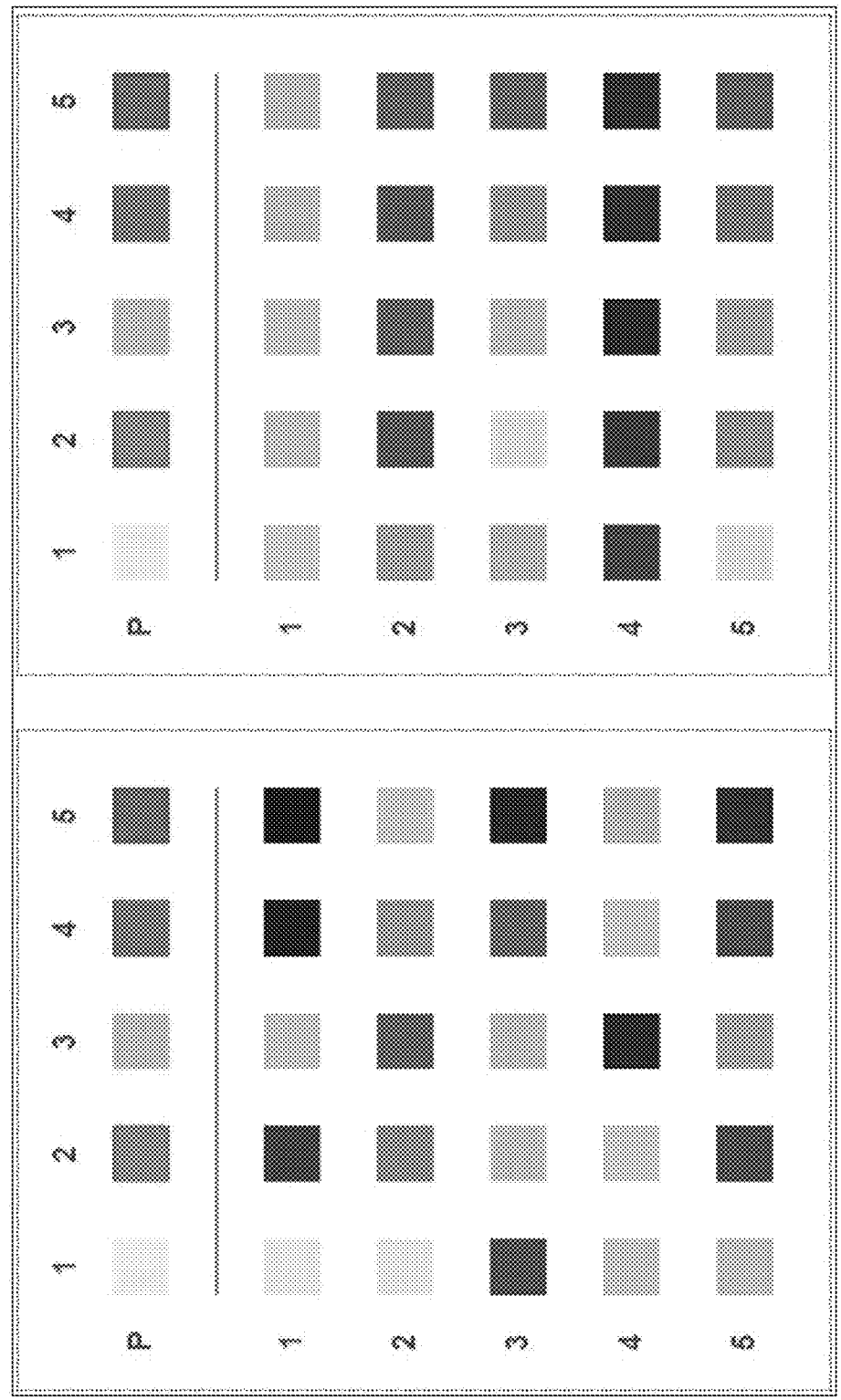
FIG. 20 is an exemplary screenshot of color palette, before and after adapting to column.

And then calculating the appropriate lightness value Lgt(A) so to provide the resulting PB(A). The weights for the average calculation are determined by designer 2, which could set them, for example, using a slider user interface. It will be appreciated that the weight for B (the column to which A is adapted) may typically be much higher than the weight for A as is illustrated in FIG. 20 to which reference is now made. See (for example) the effect of adapting all columns to column 3 in FIG. 20. In this example, the full weight (100%) is given to the base column 3. It will be appreciated that column updating handler 24 may be applied when handling subordinate colors in the adapted columns which have overrides applied to them. It will also be appreciated that column updating handler 24 may also implement column unification adapting all cells in each row to the average perceived brightness of the specific row—rather than adapting to a specific column. Column updating handler 24 may also extend this operation so it can be applied to columns in additional color schemes (which are not the color schemes containing the base column).

Therefore system 100 may enable designer 2 to make modifications to the color schemes so as to create a set of color schemes specific to a particular document component according to pre-defined hierarchical and inheritance rules and at the same time maintain the perceived brightness difference between elements in the document.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system implementable on a computing device for handling color assignment within a complex document, the system comprising:

a user interface to facilitate user modification of at least one first color to at least one second color within a previously chosen color scheme for a component of said document, said previously chosen color scheme having a predetermined number X of principal colors and a predetermined number Y of associated subordinate colors per principal color and wherein said principal colors and said associated subordinate colors are displayed as a matrix with said principal colors forming the top row and said associated subordinate colors stemming from them as a column;

a color handler to modify said previously chosen color scheme to produce an updated color scheme to match a perceived brightness of said at least one second color throughout at least a portion of said updated color scheme, said color handler further comprising a unifier to calculate an average perceived brightness for all cells in a row within said matrix and to change the lightness value for each cell while keeping the same hue and saturation to ensure that all cells within said row have said perceived brightness;

an inheritance processor to implement said user modification according to at least one pre-defined inheritance relationship between said component and at least one other component in said document; and a color processor to process and apply said updated color scheme at least to said component.

2. The system according to claim 1 and wherein said color handler comprises a brightness handler to determine at least one of the HSV (hue, saturation, lightness) color parameters needed to generate said perceived brightness for said at least one second color.

3. The system according to claim 1 and wherein said color handler comprises a color overrider to modify one of: saturation, lightness, and perceived brightness while keeping constant the hue of said at least one second color to generate at least one second color value for at least one color cell of said matrix for a particular portion of said document.

4. The system according to claim 3 wherein said color overrider comprises a color blender to modify said one of: saturation, lightness, and perceived brightness using linear range mapping.

5. The system according to claim 4 and wherein said color blender comprises a bucket handler to divide an available perceived brightness range into divisions to create target perceived brightness values for said color blender and wherein sizes of said divisions are not uniform.

6. The system according to claim 1 and wherein said color handler comprises a column adapter handler to adapt a target column of said matrix to a base column to create uniformity between said associated subordinate colors positioned in the same row but in different columns.

7. The system according to claim 1 and wherein said color handler comprises an inverter to reverse said previously chosen color scheme while retaining the association of components of said document to specific positions in said updated color scheme.

8. A method for handling color assignment within a complex document, the method implemented on a processor and comprising:

on said processor, facilitating user modification of at least one first color to at least one second color within a previously chosen color scheme for a component of said document, said previously chosen color scheme having a predetermined number X of principal colors and a predetermined number Y of associated subordinate colors per principal color and wherein said principal colors and said associated subordinate colors are displayed as a matrix with said principal colors forming the top row and said associated subordinate colors stemming from them as a column;

on said processor, modifying said previously chosen color scheme to produce an updated color scheme to match a perceived brightness of said at least one second color throughout at least a portion of said updated color scheme, said modifying said previously chosen color scheme further comprising calculating an average perceived brightness for all cells in a row within said matrix and changing the lightness value for each cell while keeping the same hue and saturation to ensure that all cells within said row have said perceived brightness;

implementing said user modification according to at least one pre-defined inheritance relationship between said component and at least one other component in said document; and processing and applying said updated color scheme at least to said component.

9. The method according to claim 8 and wherein said modifying said previously chosen color scheme comprises determining at least one of the HSV (hue, saturation, lightness) color parameters needed to generate said perceived brightness for said at least one second color.

10. The method according to claim 8 and wherein said modifying said previously chosen color scheme comprises modifying one of: saturation, lightness, and perceived brightness while keeping constant the hue of said at least one second color to generate at least one second color value for at least one color cell of said matrix for a particular portion of said document.

11. The method according to claim 10 wherein said modifying said previously chosen color scheme comprises modifying said one of: saturation, lightness, and perceived brightness using linear range mapping.

12. The method according to claim 11 and wherein said modifying said one of: saturation, lightness, and perceived brightness comprises dividing an available perceived brightness range into divisions and creating target perceived brightness values for said wherein modifying said one of: saturation, lightness, and perceived brightness and wherein sizes of said divisions are not uniform.

13. The method according to claim 8 and wherein modifying said previously chosen color scheme comprises adapting a target column of said matrix to a base column to create uniformity between said associated subordinate colors positioned in the same row but in different columns.

14. The method according to claim 8 and wherein said modifying said previously chosen color scheme comprises reversing said previously chosen color scheme comprises while retaining the association of components of said document to specific positions in said updated color scheme.

* * * * *